US012236798B2

United States Patent
Scholz et al.

(10) Patent No.: US 12,236,798 B2
(45) Date of Patent: Feb. 25, 2025

(54) PRESENTATION ASSESSMENT AND VALUATION SYSTEM

(71) Applicant: eduPresent LLC, Loveland, CO (US)

(72) Inventors: Brian A. Scholz, Fort Collins, CO (US); Bruce E. Fischer, Windsor, CO (US)

(73) Assignee: Bongo Learn, Inc., Loveland, CO (US)

( * ) Notice: Subject to any disclaimer, the term of this patent is extended or adjusted under 35 U.S.C. 154(b) by 1470 days.

(21) Appl. No.: 16/151,226

(22) Filed: Oct. 3, 2018

(65) Prior Publication Data

US 2020/0111386 A1    Apr. 9, 2020

(51) Int. Cl.
| | |
|---|---|
| G09B 19/04 | (2006.01) |
| G06F 3/01 | (2006.01) |
| G06F 40/253 | (2020.01) |
| G06V 40/16 | (2022.01) |
| G10L 15/22 | (2006.01) |
| G10L 15/26 | (2006.01) |
| G10L 25/48 | (2013.01) |
| G10L 25/63 | (2013.01) |

(52) U.S. Cl.
CPC ............. G09B 19/04 (2013.01); G06F 3/013 (2013.01); G06F 40/253 (2020.01); G06V 40/174 (2022.01); G10L 15/22 (2013.01); G10L 15/26 (2013.01); G10L 25/63 (2013.01); G10L 25/48 (2013.01)

(58) Field of Classification Search
CPC ....... G09B 19/04; G06F 3/013; G06F 40/253; G06V 40/174; G10L 15/22; G10L 15/26; G10L 25/63; G10L 25/48

USPC ........................................................ 434/185
See application file for complete search history.

(56) References Cited

U.S. PATENT DOCUMENTS

| | | |
|---|---|---|
| 5,764,901 A | 6/1998 | Skarbo et al. |
| 6,154,631 A | 11/2000 | Remschel |
| 6,471,521 B1 | 10/2002 | Dornbush et al. |

(Continued)

FOREIGN PATENT DOCUMENTS

| | | |
|---|---|---|
| CA | 3106719 A | 4/2020 |
| EP | 2667340 A1 | 11/2013 |

(Continued)

OTHER PUBLICATIONS

Chris Deziel, "How to Calculate an Average Score", shttps://sciencing.com/calculate-average-score-6395171.html, Mar. 13, 2018 (Year: 2018).*

(Continued)

Primary Examiner — Malina D. Blaise
Assistant Examiner — Andrew Bodendorf
(74) Attorney, Agent, or Firm — Craig R. Miles; CR MILES P.C.

(57) ABSTRACT

A computer implemented interactive presentation assessment and valuation system which provides a server computer that allows one or more computing devices to access a presentation assessment and valuation system which provides a presentation analyzer which applies standardized scoring algorithms to the video data or audio data associated with a presentation and correspondingly generates standardized word rate, word clarity, filler words, tone, or eye contact scores, and calculates a presentation score based upon an average or weighted average of the scores.

14 Claims, 10 Drawing Sheets

(56) References Cited

U.S. PATENT DOCUMENTS

| | | | |
|---|---|---|---|
| 6,484,316 B1 | 11/2002 | Lindberg | |
| 6,577,333 B2 | 6/2003 | Tai et al. | |
| 6,871,043 B2 | 3/2005 | Sand | |
| 7,185,054 B1 | 2/2007 | Ludwig et al. | |
| 7,478,129 B1 | 1/2009 | Chemtob | |
| 7,496,845 B2 | 2/2009 | Deutscher et al. | |
| 7,506,262 B2 | 3/2009 | Gupta et al. | |
| 7,623,755 B2 | 11/2009 | Kuspa | |
| 7,809,802 B2 | 10/2010 | Lerman et al. | |
| 7,908,602 B2 | 3/2011 | Alcorn | |
| 8,108,255 B1 | 1/2012 | Robinson et al. | |
| 8,140,973 B2 | 3/2012 | Sandquist et al. | |
| 8,272,874 B2 | 9/2012 | Julia et al. | |
| 8,457,967 B2* | 6/2013 | Audhkhasi | G09B 19/04 704/235 |
| 8,473,835 B2 | 6/2013 | Hariton | |
| 8,494,857 B2* | 7/2013 | Pakhomov | G10L 17/26 704/271 |
| 8,640,030 B2 | 1/2014 | Kulas | |
| 8,696,364 B2 | 4/2014 | Cohen | |
| 8,756,057 B2* | 6/2014 | Miller | G10L 21/10 704/235 |
| 8,799,757 B2 | 8/2014 | Jewsbury et al. | |
| 8,806,320 B1* | 8/2014 | Abdo | H04N 21/43072 715/224 |
| 8,887,050 B1 | 11/2014 | Siracusano, Jr. | |
| 9,459,754 B2 | 10/2016 | Lewis et al. | |
| 9,591,072 B2 | 3/2017 | Scherbel et al. | |
| 9,792,908 B1* | 10/2017 | Bassemir | G09B 19/04 |
| 10,204,264 B1* | 2/2019 | Gallagher | H04N 21/25891 |
| 10,311,743 B2* | 6/2019 | Chen | G09B 19/00 |
| 10,423,727 B1* | 9/2019 | Juneja | G10L 15/22 |
| 10,446,055 B2* | 10/2019 | Gupta | G10L 15/187 |
| 10,460,178 B1* | 10/2019 | Fieldman | G11B 27/28 |
| 11,120,405 B2* | 9/2021 | Steinhoff | G10L 15/05 |
| 11,132,913 B1* | 9/2021 | Ramanarayanan | H04N 21/25891 |
| 2002/0059342 A1 | 5/2002 | Gupta et al. | |
| 2002/0105598 A1 | 8/2002 | Tai et al. | |
| 2002/0115051 A1 | 8/2002 | Sanda | |
| 2003/0036947 A1 | 2/2003 | Smith, III et al. | |
| 2003/0073064 A1 | 4/2003 | Riggs | |
| 2003/0152904 A1 | 8/2003 | Doty, Jr. | |
| 2003/0174160 A1 | 9/2003 | Deutscher et al. | |
| 2003/0202007 A1* | 10/2003 | Silverstein | G09B 19/04 715/730 |
| 2004/0014021 A1 | 1/2004 | Suleiman | |
| 2004/0044950 A1 | 3/2004 | Mills et al. | |
| 2004/0125133 A1 | 7/2004 | Pea et al. | |
| 2004/0143630 A1 | 7/2004 | Kaufmann et al. | |
| 2004/0153504 A1 | 8/2004 | Hutchinson | |
| 2004/0153508 A1 | 8/2004 | Alcorn et al. | |
| 2005/0084152 A1 | 4/2005 | McPeake et al. | |
| 2006/0111902 A1 | 5/2006 | Julia et al. | |
| 2006/0293889 A1 | 12/2006 | Kiss et al. | |
| 2007/0033632 A1 | 2/2007 | Baynger et al. | |
| 2007/0074116 A1 | 3/2007 | Thomas | |
| 2007/0174774 A1 | 7/2007 | Lerman et al. | |
| 2007/0179777 A1 | 8/2007 | Gupta et al. | |
| 2007/0233492 A1* | 10/2007 | Matsumoto | G10L 13/10 704/260 |
| 2007/0234214 A1 | 10/2007 | Lovejoy et al. | |
| 2007/0245243 A1 | 10/2007 | Lanza et al. | |
| 2008/0021708 A1 | 1/2008 | Bennett et al. | |
| 2008/0092047 A1 | 4/2008 | Fealkoff et al. | |
| 2008/0126387 A1 | 5/2008 | Blinnikka | |
| 2008/0133736 A1 | 6/2008 | Wensley et al. | |
| 2008/0140401 A1 | 6/2008 | Abrash et al. | |
| 2008/0254425 A1 | 10/2008 | Cohen | |
| 2008/0286739 A1 | 11/2008 | Umrigar et al. | |
| 2009/0055175 A1* | 2/2009 | Terrell, II | G10L 15/26 704/235 |
| 2009/0089062 A1* | 4/2009 | Lu | G09B 5/04 704/E11.001 |
| 2009/0112859 A1* | 4/2009 | Dehlinger | G06F 16/382 |
| 2009/0119258 A1 | 5/2009 | Petty | |
| 2009/0152349 A1 | 6/2009 | Bonev et al. | |
| 2009/0164904 A1 | 6/2009 | Horowitz | |
| 2009/0225164 A1 | 9/2009 | Renkis | |
| 2009/0249223 A1 | 10/2009 | Barsook et al. | |
| 2009/0288011 A1 | 11/2009 | Piran et al. | |
| 2009/0327856 A1 | 12/2009 | Mouilleseaux et al. | |
| 2010/0011292 A1 | 1/2010 | Marinkovich et al. | |
| 2010/0056128 A1 | 3/2010 | Hwang et al. | |
| 2010/0223056 A1* | 9/2010 | Kadirkamanathan | G10L 13/08 704/E15.005 |
| 2010/0251177 A1 | 9/2010 | Geppert et al. | |
| 2010/0274584 A1 | 10/2010 | Kim | |
| 2010/0274847 A1 | 10/2010 | Anderson et al. | |
| 2010/0281384 A1 | 11/2010 | Lyons et al. | |
| 2010/0293478 A1 | 11/2010 | Dahlgren | |
| 2011/0010624 A1 | 1/2011 | Vanslette et al. | |
| 2011/0026898 A1 | 2/2011 | Lussier et al. | |
| 2011/0123965 A1* | 5/2011 | Yu | G09B 19/04 434/156 |
| 2011/0214045 A1 | 9/2011 | Sumler et al. | |
| 2011/0223572 A1* | 9/2011 | Bobbitt, Jr. | A63B 69/12 434/254 |
| 2011/0231194 A1 | 9/2011 | Lewis | |
| 2011/0270922 A1 | 11/2011 | Jones et al. | |
| 2011/0296312 A1 | 12/2011 | Boyer et al. | |
| 2012/0036423 A1 | 2/2012 | Haynes et al. | |
| 2012/0210217 A1 | 8/2012 | Abbas et al. | |
| 2012/0288845 A1 | 11/2012 | Kumar | |
| 2013/0073964 A1 | 3/2013 | Meaney et al. | |
| 2013/0125000 A1 | 5/2013 | Fleischhauer et al. | |
| 2013/0191763 A1 | 7/2013 | Jones et al. | |
| 2013/0298025 A1* | 11/2013 | Lewis | G09B 5/06 715/720 |
| 2013/0298026 A1 | 11/2013 | Fitzpatrick | |
| 2013/0332879 A1 | 12/2013 | Lewis | |
| 2013/0334300 A1* | 12/2013 | Evans | H04N 21/47217 235/494 |
| 2013/0346332 A1 | 12/2013 | Schalk et al. | |
| 2014/0025379 A1 | 1/2014 | Ganapathiraju et al. | |
| 2014/0035920 A1* | 2/2014 | Duwenhorst | G06T 11/001 345/440 |
| 2014/0108562 A1 | 4/2014 | Panzer | |
| 2014/0279852 A1 | 9/2014 | Chen | |
| 2014/0356822 A1* | 12/2014 | Hoque | G09B 19/04 434/185 |
| 2015/0006759 A1 | 1/2015 | Scherbel et al. | |
| 2015/0121225 A1 | 4/2015 | Somasundaram et al. | |
| 2015/0269857 A1 | 9/2015 | Feng | |
| 2015/0310852 A1* | 10/2015 | Spizzo | A61B 5/743 704/251 |
| 2016/0019202 A1* | 1/2016 | Adams | H04N 21/8547 704/9 |
| 2016/0049094 A1* | 2/2016 | Gupta | G10L 15/02 434/185 |
| 2016/0269345 A1 | 9/2016 | Weizman | |
| 2016/0316059 A1* | 10/2016 | Nuta | G10L 15/26 |
| 2017/0287355 A1 | 10/2017 | Pogorelik | |
| 2018/0068662 A1 | 3/2018 | Schlippe et al. | |
| 2018/0075845 A1* | 3/2018 | Kochura | G06F 16/24578 |
| 2018/0122374 A1* | 5/2018 | Bassemir | G09B 19/04 |
| 2018/0349335 A1* | 12/2018 | Hodge | H04L 67/535 |
| 2019/0108219 A1* | 4/2019 | Barrett | G06F 40/30 |
| 2019/0214039 A1* | 7/2019 | Nakayama | G10L 15/22 |
| 2019/0311331 A1* | 10/2019 | Steinhoff | G10L 15/05 |
| 2020/0065612 A1* | 2/2020 | Xu | G06V 10/82 |
| 2021/0004768 A1* | 1/2021 | Steinhoff | G06V 40/176 |
| 2021/0090137 A1* | 3/2021 | Lewis | G06Q 30/0282 |

(56) References Cited

U.S. PATENT DOCUMENTS

| | | | | | |
|---|---|---|---|---|---|
| 2021/0358476 | A1* | 11/2021 | Leone | | G10L 15/02 |
| | | | | | 434/185 |
| 2022/0237892 | A1* | 7/2022 | Anderton-Yang | | G06V 10/82 |

FOREIGN PATENT DOCUMENTS

| | | | | |
|---|---|---|---|---|
| WO | 2012/057835 | | 5/2012 | |
| WO | WO 2013/188290 | | 12/2013 | |
| WO | WO-2016014032 | A1 * | 1/2016 | ............ G06Q 10/10 |
| WO | WO 2016/146978 | A1 | 9/2016 | |

OTHER PUBLICATIONS

Chaiwongsai et al. "Improved Tone Model for Low Complexity Tone Recognition" SICE Annual Conference 2014 (Year: 2014).*
Kurihara et al. "Presentation Sensei: A Presentation Training System using Speech and Image Processing" ICMI'07, Nov. 12-15, 2007, Nagoya, Aichi, Japan. (Year: 2007).*
Shangavi et al. "Self-Speech Evaluation with Speech Recognition and Gesture Analysis" 2018 National Information Technology Conference (NITC), Oct. 2-4, Colombo, Sri Lanka (Year: 2018).*
Naim et al. "Automated Analysis and Prediction of Job Interview Performance" Automated Analysis and Prediction of Job Interview Performance vol. 9, No. 2, Apr.-Jun. 2018 (Year: 2018).*
Jeon et al. "Acoustic Feature-based Non-scorable Response Detection for an Automated Speaking Proficiency Assessment" INTERSPEECH 2012 ISCA's 13th Annual Conference Portland, OR, USA (Year: 2021).*
Close, "Giving Meaning to Test Scores" published at www.renaissance. com/2016/05/12/giving-meaning-to-test-scores/ May 12, 2016 (Year: 2016).*
PCT International Patent Application No. PCT/US13/44968, International Search Report and Written Opinion of the International Search Authority, dated Dec. 20, 2013, 21 pages.
PCT International Patent Application No. PCT/US18/28179; International Search Report and Written Opinion of the International Searching Authority dated Jun. 27, 2018, 12 pages.
PCT International Patent Application No. PCT/US15/14493; International Search Report and Written Opinion of the International Searching Authority dated May 14, 2015, 14 pages.
Apsolon. Video Tips & Tricks ep. 09: How to add YouTube Annotations, Mar. 6, 2009, YouTube, https://www.youtube,com. watch?v=XAG3z4scWTw.
Blakowski, et al. Tools for Specifying and Executing Synchronized Multimedia Presentations. Conference Proceedings of 2nd ACM International Workshop on Network and Operating System Support for Digital Audio and Video, Heidelberg, Germany; Nov. 1991, pp. 271-282.
Goreact Blog. Introducing GoReact Slide Sync. Website, https://blog.goreact.com, originally downloaded Apr. 21, 2017, 4 pages total.
Goreact. Affordable Online Video Assessment. Website, https://goreact.com, originally downloaded Mar. 28, 2017, 5 pages total.
Kira Talent. Video Admissions Platform. Website, https://www.kiratalent.com, originally downloaded Apr. 3, 2017, 7 pages total.
Jfrumar. Omnisio Presentation Screencast. YouTube, YouTube, May 17, 2008, www.youtube.com/watch?v=7_SrHIAqlak.
U.S. Appl. No. 15/409,935, filed Jan. 19, 2017.
U.S. Appl. No. 15/954,210, filed Apr. 16, 2018.
U.S. Appl. No. 14/960,234, filed Dec. 4, 2015.
U.S. Appl. No. 15/729,149, filed Oct. 10, 2017.
U.S. Appl. No. 14/174,127, filed Feb. 6, 2014.
U.S. Appl. No. 14/480,509, filed Sep. 8, 2014.
U.S. Appl. No. 16/232,994, filed Dec. 26, 2018.
Australian Patent Application No. 2015214261; Office Action dated Jan. 31, 2019, 5 pages.
Australian Patent Application No. 2017201408; Office.Action dated Jan. 15, 2018, 4 pages.
Australian Patent Application No. 2017201408; Office.Action dated Jan. 14, 2019, 6 pages.
Australian Patent Application No. 2017201408; Office Action dated Jun. 28, 2018, 4 pages.
Canadian Patent Application No. 2,853,480; Office Action dated Sep. 7, 2017, 4 pages total.
Canadian Patent Application No. 2,914,902; Office Action dated Oct. 9, 2018, 11 pages total.
Canadian Patent Application No. 2,949,204; Office Action dated Nov. 20, 2018, 3 pages total.
European Patent Application No. 11836763.0; Office Action dated Sep. 15, 2017, 5 pages total.
European Patent Application No. 13804359.1; Office Action dated Mar. 7, 2017, 7 pages total.
U.S. Appl. No. 15/284,408, filed Oct. 3, 2016.
U.S. Appl. No. 61/658,298, filed Jun. 11, 2012.
International Patent Cooperation Treaty Patent Application No. PCT/US2011/001820, filed Oct. 27, 2011.
U.S. Appl. No. 61/441,670, filed Feb. 11, 2011.
U.S. Appl. No. 61/407,548, filed Oct. 28, 2010.
PCT International Patent Application No. PCT/US15/14493; International Search Report and Written Opinion mailed May 14, 2015, 14 pages total.
U.S. Appl. No. 13/842,846; Office Action mailed Dec. 31, 2014.
Apple. iPhone User Guide For iOS 4.2 Software; Copyright 2010, 5 total pages (excerpt).
ZeeBigBang. FORscene Tutorial (full). Vimeo. N.p., Oct. 14, 2010. Website, https://vimeo.com/15836683, originally downloaded Sep. 1, 2015, 1 page.
European Patent Application No. 15746331.6; Office Action dated Sep. 29, 2020, 8 pages.
European Patent Application No. 19868267.6; partial supplementary European Search Report dated May 17, 2022, 14 pages.
U.S. Appl. No. 16/655,354; Office Action mailed Sep. 17, 2020.
HP WebCam User Guide. Feb. 2012 (retrieved on Sep. 10, 2020); retrieved from internet: <URL: http://h10032.wwl.hp.com/ctg/Manual/c03367177.pdf> (Year: 2012).
Izbassarova et al. Automated Rating of Recorded Classroom Presentations using Speech Analysis in Kazakh. arXiv:1801.00453, Cornell University Library, Jan. 2018, 6 pages.
PCT International Patent Application No. PCT/US19/52460; International Search Report and Written Opinion of the International Searching Authority dated Dec. 6, 2019, 14 pages.
Tausczik et al. The Psychological Meaning of Words: LIWC and Computerized Text Analysis Methods. Journal of Language and Social Psychology, Dec. 2009, 29(1)24-54.
European Patent Application No. 19868267.6; Extended European Search Report dated Aug. 4, 2022, 16 pages.
Canadian Patent Application No. 3,106,719, Office Action dated Apr. 12, 2023, 4 pages.
PCT International Patent Application No. PCT/US23/23481, International Search Report and Written Opinion of the International Searching Authority dated Nov. 14, 2023, 16 pages.

* cited by examiner

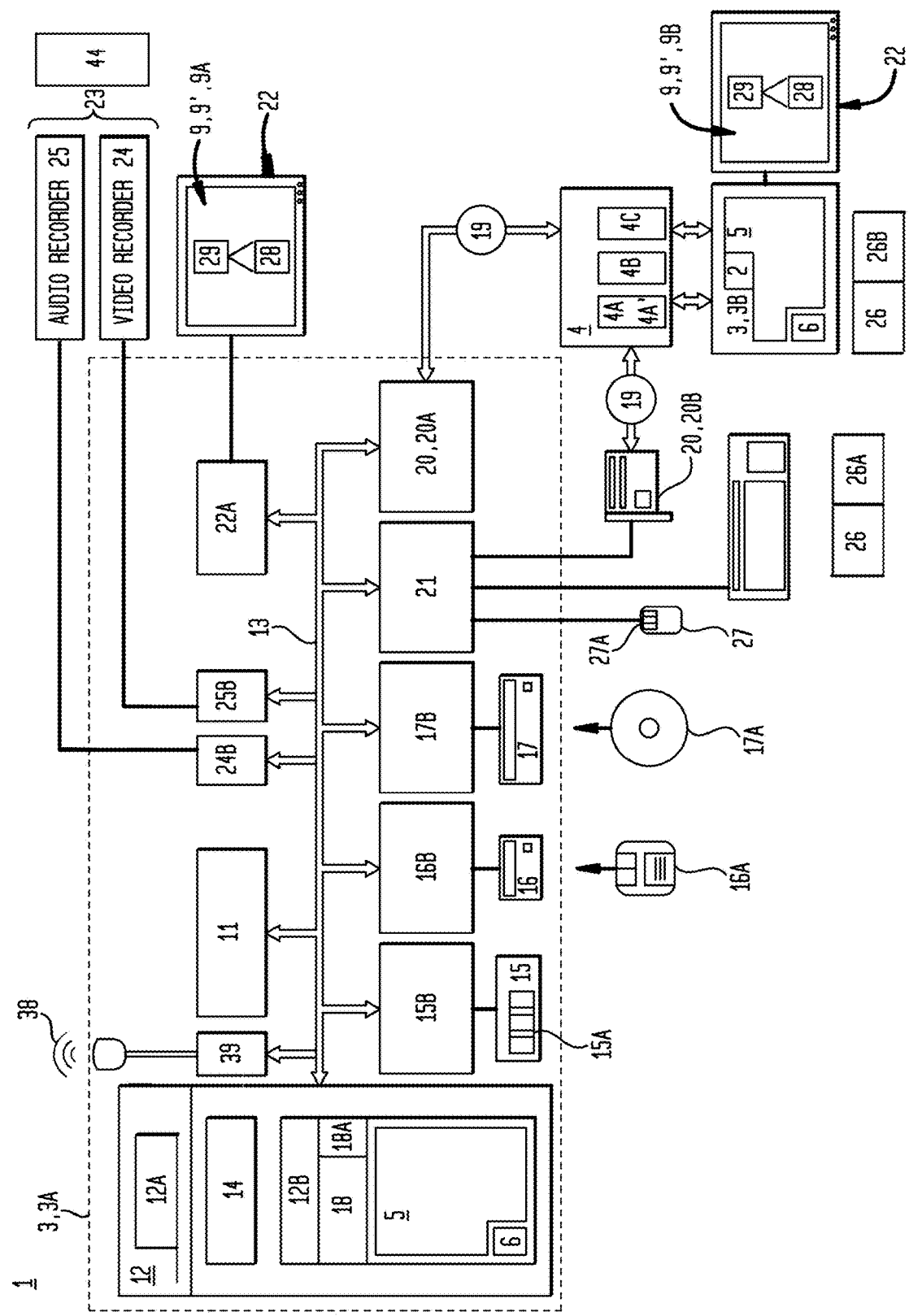

FIG. 5

| Assignments & My Video | | | | | | | | |
|---|---|---|---|---|---|---|---|---|
| Video state | Assignment (due date) | | Video (date submitted) | Slides | | Sync Comments | Grade | Transcript | Archive |
| ⬆ | test 1 (02.28.11) | 126 | 127 Exam : test 1 (02.05.11 12:35 pm) | ● | Auto Access | ● | ● | upload | ● |
| ⬆ | test 2 (02.28.11) | 126 | 127 Exam : test 2 (02.06.11 09:19 am) | ● | Auto Access | ● | ● | upload | ● |
| start exam | test 3 (02.28.11) instructions | 126 | 127 | | | | | | |
| start exam | test 4 (02.28.11) instructions | 126 | 127 | | | | | | | ns to coordinate operation of a student user interface and an instructor user interface on the plurality of computing devices within the system, and by user command in the student user interface:

PRESENTATION ASSESSMENT AND VALUATION SYSTEM

I. FIELD OF THE INVENTION

Generally, a computer implemented interactive presentation assessment and valuation system which provides a server computer that allows one or more computing devices to access a presentation assessment and valuation program which provides a presentation analyzer which applies standardized scoring algorithms to the video data or audio data associated with a presentation and correspondingly generates standardized word rate, word clarity, filler word, tone, or eye contact scores, and calculates a presentation score based upon an average or weighted average of the scores.

II. BACKGROUND OF THE INVENTION

Currently, in the context of distance learning, there does not exist a computer implemented system which coordinates use of a presentation analyzer between a student user for analysis of video data or audio data associated with preparation of a presentation and an instructor user for analysis of video data or audio data associated with a presentation submitted by the student user which presentation analyzer applies standardized scoring algorithms to the video data or audio data associated with a presentation and correspondingly generates standardized word rate, word clarity, filler word, tone, or eye contact scores, and calculates a presentation score based upon an average or weighted average of the scores.

III. SUMMARY OF THE INVENTION

Accordingly, a broad object of embodiments of the invention can be to provide a presentation assessment and valuation system for distance learning distributed on one or more servers operably coupled by a network to one or more computing devices to coordinate use of a presentation analyzer between a student user for analysis of video data or audio data associated with preparation of a presentation and an instructor user for analysis of video data or audio data associated with a presentation submitted by the student user which presentation analyzer applies standardized scoring algorithms to the video data or audio data associated with a presentation and correspondingly generates standardized word rate, word clarity, filler word, tone, or eye contact scores, and calculates a presentation score based upon an average or weighted average of the scores.

Another broad object of embodiments of the invention can be to provide method in a presentation assessment and valuation system for coordinating use of a presentation analyzer between a student user for analyzing video data or audio data associated with preparing a presentation and an instructor user for analyzing video data or audio data associated with a presentation submitted by the student user which method further includes executing a presentation analyzer to: apply standardized scoring algorithms to the video data or audio data associated with a presentation; and generating standardized word rate scores, word clarity scores, filler word scores, tone scores, or eye contact scores; and further calculating a presentation score based upon averaging or weighted averaging of the scores.

Another broad object of embodiments of the invention can be to provide a method in a presentation assessment and valuation system which includes serving a presentation assessment and valuation program to a plurality of computdecode video data or audio data, or combined data, in presentation data to display a video in the video display area on the display surface or generate audio via an audio player associated with the student user computing device;

concurrently depict in the student user interface indicators of one or more of word rate, word clarity, filler words, tone variance, or eye contact synchronized in timed relation with the video or audio of the presentation;

depict in the student user interface one or more of a word rate score, word clarity score, filler word score, tone variance score or eye contact score by applying algorithms to the video data or audio data associated with the presentation data;

depict a presentation score based upon averaging or weighted averaging of one or more of the word rate scores, word clarity scores, filler word scores, tone scores, or eye contact scores; and submit the presentation data to a database within the system.

Naturally, further objects of the invention are disclosed throughout other areas of the specification, drawings, photographs, and claims.

IV. BRIEF DESCRIPTION OF THE DRAWINGS

FIG. 2A is a block diagram of an illustrative computer means, network means and non-transitory computer readable medium which provides computer-executable instructions to implement an embodiment of the interactive presentation assessment and valuation system.

FIG. 5 depicts an illustrative embodiment of an assignment events interface implemented by operation of an embodiment of the interactive presentation assessment and valuation system.

V. DETAILED DESCRIPTION OF THE INVENTION

Figure 1A:
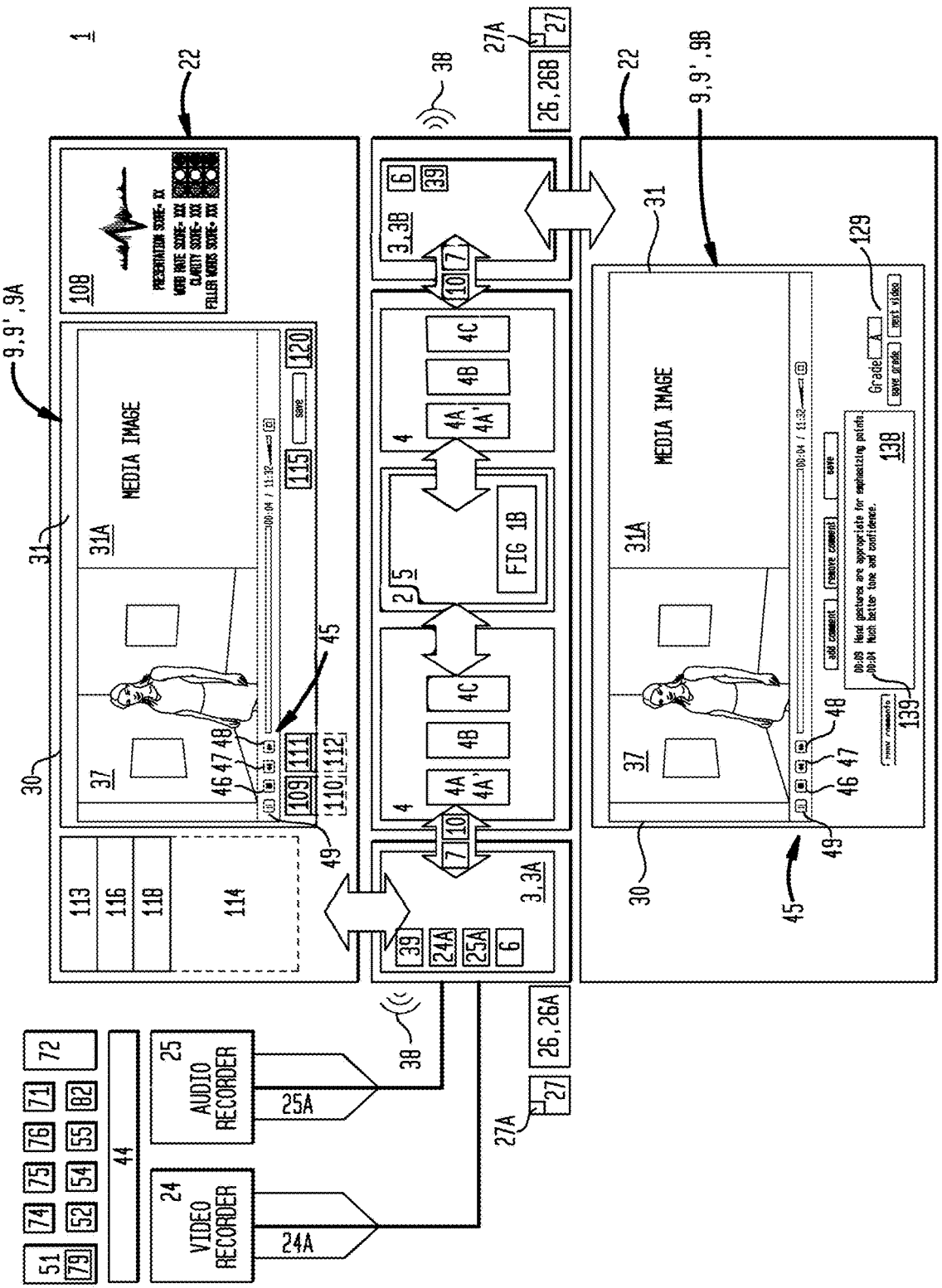
FIG. 1A is a block diagram of a particular embodiment of the inventive computer implemented interactive presentation assessment and valuation system.
Figure 1B:
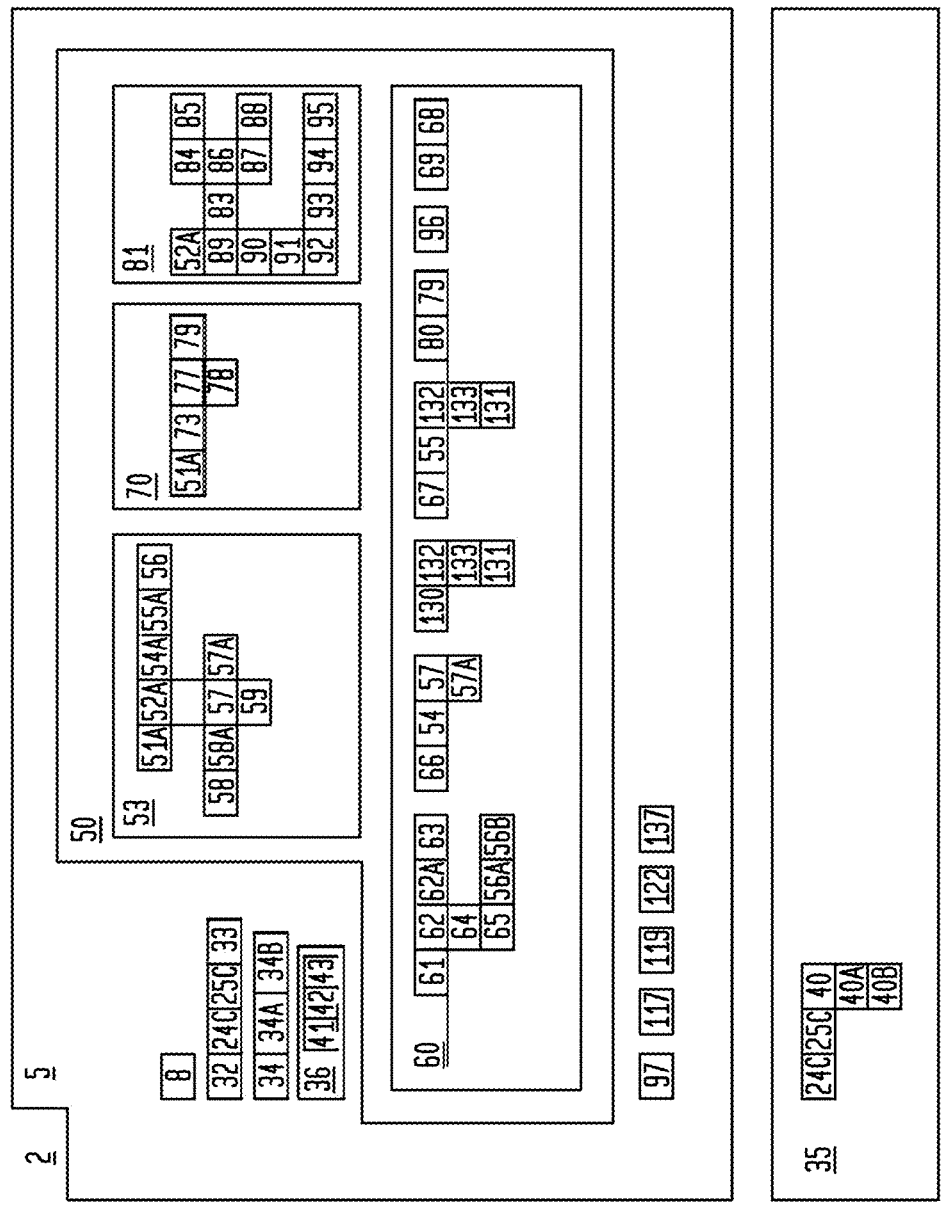
FIG. 1B is a block diagram of a server including a processor communicatively coupled to a non-transitory computer readable media containing an embodiment of a presentation assessment and valuation program.
Figure 2B:
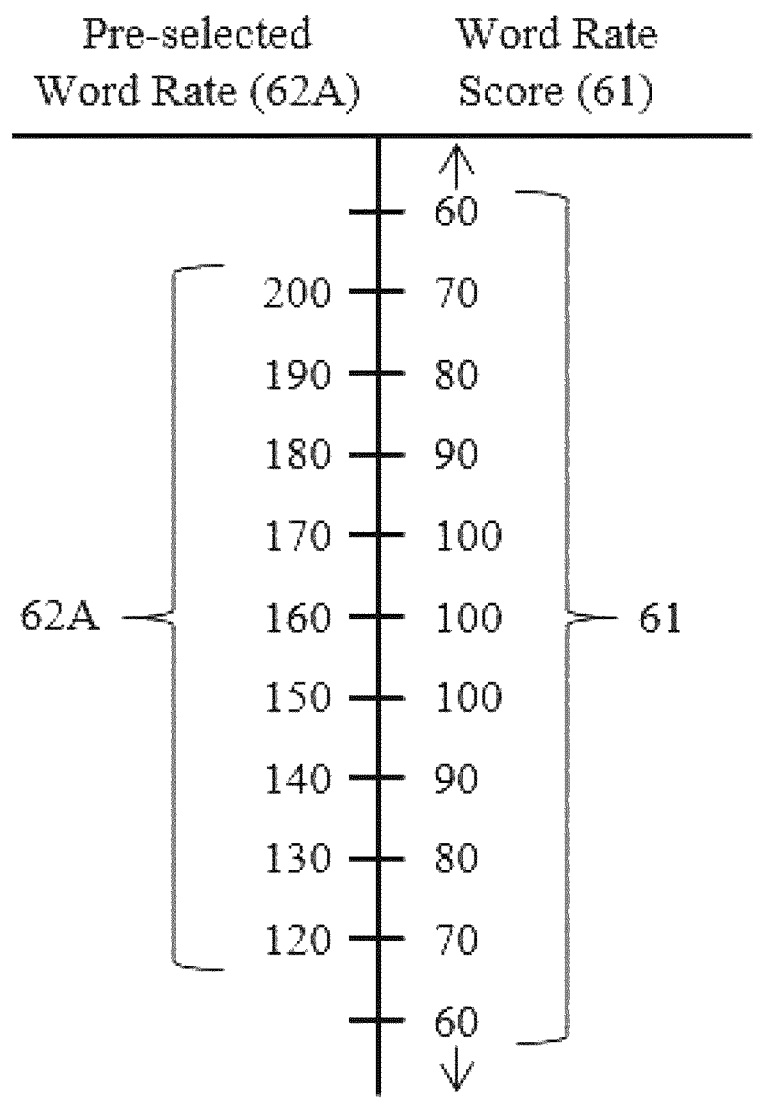
FIG. 2B is an illustration of a word rate scoring matrix.

Generally, referring to FIGS. 1A, 1B and 2A, a presentation assessment and valuation system (1)(also referred to as the "system") can be distributed on one or more servers (2) operably coupled to one or more computing devices (3) by a network (4), including as examples, a wide area network (4A) such as, the Internet (4A'), a local area network (4B), or cellular-based wireless network(s)(4C) (individually or collectively the "network"). The one or more computing devices (3) can include as illustrative examples: desktop computer devices, and mobile computer devices such as personal computers, slate computers, tablet or pad computers, cellular telephones, personal digital assistants, smartphones, programmable consumer electronics, or combinations thereof.

The network (4) supports a presentation assessment and valuation program (5)(also referred to as the "program") which can be accessed by or downloaded from one or more servers (2) to the one or more computing device (3) to confer all of the functions of the program (5) and the system (1) to each of the one or more computing devices (3).

In particular embodiments, the program (5) can be served by the server (2) over the network (4) to coordinate operation of one or more student computing devices (3A) with operation of one or more instructor computing devices (3B). However, this is not intended to preclude embodiments in which the program (5) may be contained on or loaded to a computing device (3), or parts thereof contained on or downloaded to one or more student computing devices (3A) or one or more instructor computing devices (3B) from one or more of: a computer disk, universal serial bus flash drive, or other non-transitory computer readable media.

While embodiments of the program (5) may be described in the general context of computer-executable instructions such as program modules which utilize routines, programs, objects, components, data structures, or the like, to perform particular functions or tasks or implement particular abstract data types, it is not intended that any embodiments be limited to a particular set of computer-executable instructions or protocols. Additionally, in particular embodiments, while particular functionalities of the program (5) may be attributable to one of the student computing device (3A) or the instructor computing device (3B); it is to be understood that embodiments may allow implementation of a function by more than one device, or the function may be coordinated by the system (1) between two or more computing devices (3).

Now, referring primarily to FIGS. 1A and 2A, each of the one or more computing devices (3)(3A)(3B) can include an Internet browser (6)(also referred to as a "browser"), as illustrative examples: Microsoft's INTERNET EXPLORER®, GOOGLE CHROME®, MOZILLA®, FIREFOX®, which functions to download and render computing device content (7) formatted in "hypertext markup language" (HTML). In this environment, the one or more servers (2) can contain the program (5) including a user interface module (8) which implements the most significant portions of one or more user interface(s)(9) which can further depict a combination of text and symbols in a graphical user interface (9') to represent options selectable by user command (10) to activate functions of the program (5). As to these embodiments, the one or more computing devices (3)(3A)(3B) can use the browser (6) to depict the graphical user interface (9) including computing device content (7) and to relay selected user commands (10) back to the one or more servers (2). The one or more servers (2) can respond by formatting additional computing device content (7) for the respective user interfaces (9) including graphical user interfaces (9').

Again, referring primarily to FIG. 1A, in particular embodiments, the one or more servers (2) can be used primarily as sources of computing device content (7), with primary responsibility for implementing the user interface (9)(9') being placed upon each of the one or more computing devices (3). As to these embodiments, each of the one or more computing devices (3) can download and run the appropriate portions of the program (5) implementing the corresponding functions attributable to each computing device (3)(3A)(3B).

Now referring primarily to FIG. 2A, as an illustrative example, a computing device (3)(3A)(encompassed by broken line) can include a processing unit (11), one or more memory elements (12), and a bus (13)(which operably couples components of the client device (3)(3A), including without limitation the memory elements (12) to the processing unit (11). The processing unit (11) can comprise one central-processing unit (CPU), or a plurality of processing units which operate in parallel to process digital information. The bus (13) may be any of several types of bus configurations including a memory bus or memory controller, a peripheral bus, and a local bus using any of a variety of bus architectures. The memory element (12) can without limitation be a read only memory (ROM)(12A) or a random access memory (RAM)(12B), or both. A basic input/output system (BIOS)(14), containing routines that assist transfer of data between the components of the computing device (3), such as during start-up, can be stored in ROM (12A). The client device (3) can further include one or more of a hard disk drive (15) for reading from and writing to a hard disk (15A), a magnetic disk drive (16) for reading from or writing to a removable magnetic disk (16A), and an optical disk drive (17) for reading from or writing to a removable optical disk (17A) such as a CD ROM or other optical media. The hard disk drive (15), magnetic disk drive (16), and optical disk drive (17) can be connected to the bus (13) by a hard disk drive interface (15B), a magnetic disk drive interface (16B), and an optical disk drive interface (17B), respectively. The drives and their associated non-transitory computer-readable media provide nonvolatile storage of computer-readable instructions, data structures, program modules and other data for the computing device (3)(3A)(3B)

It can be appreciated by those skilled in the art that any type of non-transitory computer-readable media that can store data that is accessible by the computing device (3), such as magnetic cassettes, flash memory cards, digital video disks, Bernoulli cartridges, random access memories (RAMs), read only memories (ROMs), and the like, may be used in a variety of operating environments. A number of program modules may be stored on one or more servers (2) accessible by the computing device (3), or on the hard disk drive (15), magnetic disk (16), optical disk (17), ROM (12A), or RAM (12B), including an operating system (18), one or a plurality of application programs (18A) and in particular embodiments the entirety or portions of the interactive presentation assessment and valuation program (5) which implements the user interfaces (9)(9') one or more student user interface(s)(9A) and the one or more administrator user interface(s)(9B) or other program interfaces.

The one or more computing devices (3)(3A)(3B) can operate in the network (4) using one or more logical connections (19) to connect to one or more of server computers (2) and transfer computing device content (7). These logical connections (19) can be achieved by one or more communication devices (20) coupled to or a part of the one or more computing devices (3); however, the invention is not limited to any particular type of communication device (20). The logical connections (19) depicted in FIG. 2A can include a wide-area network (WAN)(4A), a local-area network (LAN) (4B), or cellular-based network (4C).

When used in a LAN-networking environment, the computing device (3) can be connected to the local area network (4B) through a network interface (20A), which is one type of communications device (20). When used in a WAN-networking environment, the computing device (3) typically includes a modem (20B), a type of communications device, for establishing communications over the wide area network (4A). The modem (20B), which may be internal or external, can be connected to the bus (13) via a serial port interface (21). It is appreciated that the network connections shown are illustrative and other means of and communications devices can be used for establishing a communications link between the computing devices (3)(3A)(3B) the server computers (2).

A display surface (22), such as a graphical display surface, provided by a monitor screen or other type of display device can also be connected to the computing devices (3)(3A)(3B). In addition, each of the one or more computing devices (3)(3A)(3B) can further include peripheral input devices (23) such as a video recorder (24), for example a camera, video camera, web camera, mobile phone camera, video phone, or the like, and an audio recorder (25) such as microphones, speaker phones, computer microphones, or the like. The audio recorder (25) can be provided separately from or integral with the video recorder (24). The video recorder (24) and the audio recorder (25) can be respectively connected to the computing device (3) by a video recorder interface (24A) and an audio recorder interface (25A).

A "user command" occurs when a computing device user (26) whether a student computing device user (26A) or instructor computing device user (26B) operates a program (5) function through the use of a user command (10). As an illustrative example, pressing or releasing a left mouse button (27A) of a mouse (27) while a pointer (28) is located over an interactive control element (29) depicted in a graphical user interface (9') displayed on the display surface (22) associated with a computing device (3). However, it is not intended that the term "user command" be limited to the press and release of the left mouse button (27A) on a mouse (27) while a pointer (28) is located over an interactive control element (29), rather, a "user command" is intended to broadly encompass any command by the user (26)(26A)(26B) through which a function of the program (5)(or other program, application, module or the like) which implements a user interface (9) can be activated or performed, whether through selection of one or a plurality of interactive control elements (29) in a user interface (9) including but not limited to a graphical user interface (9'), or by one or more of user (26) voice command, keyboard stroke, screen touch, mouse button, or otherwise.

Now, referring primarily to FIGS. 1A, 1B, and 2A, the program (5) can be accessed by or downloaded from one or more servers (2) to the one or more computing devices (3) to confer all of the functions of the program (5) and the system (1) to one or more computing devices (3). In particular embodiments, the program (5) can be executed to communicate with the server (2) over the network (4) to coordinate operation of one or more student computing devices (26A) with operation of one or more instructor computing devices (26B). However, this is not intended to preclude embodiments in which the program (5) may be contained on and loaded to the student computing device(s) (3A), the instructor computing device(s)(3B) from one or more of: a computer disk, universal serial bus flash drive, or other computer readable media.

Now referring primarily to FIGS. 1A and 1B, the program (5) in part includes a user interface module (8) accessible by browser based on-line processing or downloadable in whole or in part to provide a user interface (9) including, but not necessarily limited to, a graphical user interface (9') which can be depicted on the display surface (22) associated with the computing devise(s)(3)(3A)(3B) and which correspondingly allows a user (26) whether a student user (26A) or an instructor user (26B) to execute by user command (10) one or more functions of the program (5).

Again, referring primarily to FIGS. 1A and 1B, which provides an illustrative example of a user interface (9), in accordance with the invention. The user interface (9) can be implemented using various technologies and different devices, depending on the preferences of the designer and the particular efficiencies desired for a given circumstance. By user command (10) a user (26) can activate a graphic user interface module (8) of the program (5) which functions to depict a video display area (30) in the graphical user interface (9') on the display surface (22) associated with the computing device (3). Embodiments of the graphic user interface module (8) can further function to depict further display areas in the graphical user interface (9'). As shown in the illustrative example of FIG. 1A, the graphic user interface module (8) can further function to concurrently depict a media display area (31) on the display surface (22) associated with the computing device (3).

In particular embodiments, the user (26) can utilize a video recorder (24) or an audio recorder (25) to respectively generate a video stream (24A) or an audio stream (25A).

The term "video recorder (24)" for the purposes of this invention, means any device capable of recording one or more video streams (24B). Examples of a video recorder (24) include, but are not necessarily limited to, a video camera, a video surveillance recorder, a computer containing a video recording card, mobile phones having video recording capabilities, or the like.

The term "audio recorder (25)" for the purposes of this invention, means any device capable of recording one or more audio streams (25B). Examples of an audio recorder (25) include, but are not necessarily limited to, a video camera having audio recording capabilities, mobile phones, a device containing a microphone input, a device having a line-in input, a computer containing an audio recording card, or the like.

The term "video stream (24A)" for the purposes of this invention, means one or more channels of video signal being transmitted, whether streaming or not streaming, analog or digital.

The term "audio stream (25A)" for the purposes of this invention, means one or more channels of audio signal being transmitted, whether streaming or not streaming, analog or digital.

The program (5) can further include an encoder module (32) which upon execution encodes the video stream (24B) as video stream data (24C), and the audio stream (25B) as audio stream data (25C). The encoder module (32) can further function upon execution to generate a combined stream data (24C/25C) containing video stream data (24C) and audio stream data (25C). The encoded video stream data (24C) or audio stream data (25C) can be assembled in a container bit stream (33) such as MP4, FLV, WebM, ASF, ISMA, MOV, AVI, or the like.

The program (5) can further include a codec module (34) which functions to compress the discrete video stream data (24B) or audio stream data (25B) or the combined stream (24C/25C) using an audio codec (34B) such as MP3, Vorbis, AAC, or the like. The video stream data (24C) can be compressed using a video codec (34A) such as H.264, VP8, or the like. The compressed discrete or combined stream data (24C/25C) can be retrievably stored in a database (35) whether internal to the recorder (24)(25), the computing device (3), or in a network server (2) or other network node accessible by a computing device (3).

Again referring primarily to FIGS. 1A, 1B and 2A, the program (5) can further include a media input module (36) which during acquisition of the video stream (24B) or the audio stream (25B) by the respective recorder (24)(25), as above described, decodes the discrete or combined video and audio data streams (24B)(25B) and either in the LAN (4B) or the WAN (4A) environment to display a video (37) in the video display area (30) on the display surface (22) associated with the computing device (33) or to generate audio (38) via an audio player (39) associated with the computing device (3).

Each of the video stream data (24C) or audio stream data (25C) or combined stream data (24C/25C) can be stored as media files (40) in the database (35), the server computer (2) or other network node or in the computing device (3). The media input module (36) can further function to retrieve from a server computer (2) or a computing device (3) a media file (40) containing the compressed video or audio stream data (24C)(25C).

The term "media file (40)" for the purposes of this invention means any type of file, or a pointer, to video or audio stream data (24C)(25C) and without limiting the breadth of the foregoing can be a video file, an audio filed, extensible markup language file, keyhole markup language file, or the like.

Whether the media input module (36) functions during acquisition of the video stream (24B) or the audio stream (25B) or functions to retrieve media files (40), the media input module (36) can utilize a plurality of different parsers (41) to read video stream data (24C), audio stream data (25C), or the combined stream data (24C/25C) or from any file format or media type. Once the media input module (36) receives the video stream data (24C) or the audio stream data (25C) or combined stream data (24C/25C) and opens the media file (40), the media input module (36) uses a video and audio stream decoder (42) to decode the video stream data (24C) or the audio stream data (25C) or the combined stream data (24C/25C).

The media input module (36) further functions to activate a media presentation module (43) which functions to display the viewable content of the video stream data (24C) or combined stream data (24C/25C) or the media file (40) in the video display area (30) on the display surface (22) associated with the computing device (3) or operates the audio player (39) associated with the computing device (39) to generate audio (38). As an illustrative example, a user (26) can by user command (10) in the user interface (9) select one of a plurality of video recorders (24) or one of a plurality of audio recorders (25), or combinations thereof, to correspondingly capture a video stream (24B) or an audio stream (25B), or combinations thereof, which in particular embodiments can include recording a user (26) giving a live presentation (44) which by operation of the program (5), as above described, the live video stream (24B) or the live audio stream (25B), or combinations thereof, can be processed and the corresponding live video (37) or live audio (38), or combinations thereof, can be displayed in the video image area (30) in the graphical user interface (9') or generated by the audio player (39) associated with the computing device (3). As a second illustrative example, a user (26) by user command (10) in the user interface (9) can select a media file (40) including video stream data (24C) or audio stream data (25C), or a combination thereof, which can be processed by operation of the program (5) as above described, and the corresponding video (37) or audio (38), or combinations thereof, can be displayed in the video image area (30) in the graphical user interface (9') or generated by the audio player (39) associated with the computing device (38). As a third illustrative example, a user (26) by user command (10) in the user interface (9) can select a first media file (40A), such as an video MP4 file, and can further select a second media file (40B), such as an audio MP3 file and generate a combined stream data (24C/25C) which can be processed by operation of the program (5) as above described and the video (37) can be displayed in the video image area (30) in the graphical user interface (9') and the audio (38) can be generated by the audio player (39) associated with the computing device (3).

The user interface (9) can further include a video controller (45) which includes a start control (46) which by user command (10) commences presentation of the video (37) in the video display area (30), a rewind control (47) which by click event allows re-presentation of a portion of the video (37), a fast forward control (48) which by click event increases the rate at which the video (37) is presented in the video display area (30), and a pause control (49) which by user command (10) pauses presentation of video (37) in the video display area (30).

Again, referring primarily to FIGS. 1A, 1B and 2A, the program (5) can further include a presentation analyzer (50) executable to analyze a presentation (44)(whether live or retrieved as a media file (40)). For the purposes of this invention the term "presentation" means any data stream whether live, pointed to, or retrieved as a file from a memory element, and without limitation to the breadth of the foregoing can includes a video stream data (24C) representing a speaker (51)(also referred to as "speaker data (51A)") or an audio stream data (25C) of a speech (52)(also referred to as "speech data (52A)") or a combination thereof.

In particular embodiments, the presentation analyzer (50) includes a transcription module (53) executable to analyze speech data (52A) in a presentation (44). For the purpose of this invention the term "speech" means vocalized words (54) or vocalized filler words (55), or combinations thereof. The term "words" means a sound or combination of sounds that has meaning. The term "filler word" means a sound or combination of sounds that marks a pause or hesitation that does not have a meaning, and without limitation to the breadth of the foregoing examples of filler words (55) can include, as examples: aa, um, uh, er, shh, like, right, you know.

In particular embodiments, the transcription module (53) can be discretely served by a server (2) and activated by the program (5) to analyze speech data (52A) included in a presentation (44). The transcription module (53) can be executed to recognize and count word data (54A) in the speech data (52A). A date and time stamp (56) can be coupled to each identified word (54).

The transcription module (53) can further be executed to identify and count filler word data (55A) in the speech data (52A). A date and time stamp (56) can, but need not necessarily, be coupled to each identified filler word (55).

The transcription module (53) can further function to derive and associate a word recognition confidence metric (57) with each word (54). In particular embodiments, the word recognition confidence metric (57) can be expressed as percentile confidence metric (57A) produced by extracting word confidence features (58) and processing these word confidence features (58) against one or more word confidence feature recognition thresholds (58A) for the word (54). Each word (54) can be assigned a word recognition confidence metric (57)(such as a percentile confidence metric (57A) by a confidence level scorer (59).

Again, referring primarily to FIGS. 1A, 1B and 2A, embodiments can further include a presentation scoring module (60). The presentation scoring module (60) can be executed to calculate a word rate score (61) based on matching a word rate (62) to a word rate score (61) in word rate scoring matrix (63).

In particular embodiments, the presentation scoring module (60) can be executed to calculate a Word Rate in accordance with:

$$(62)\text{Word Rate} = \frac{\text{Total Words (64)}}{\text{Minutes}((56B)\text{less}(56A))}$$

Based on the date and time stamp (56) associated with each word (54) recognized by the transcription module (53), the presentation scoring module (60) can calculate word count (64) and divide the word count (64) by elapsed time (65) between a first counted word date and time (56A) and a last word counted word date and time (56B) to obtain the word rate (62).

In particular embodiments, the presentation scoring module (60) can retrieve the word rate score (61) from a look up table which matches pre-selected word rates (62A) to corresponding word rate score (61). Depending on the application, the word rate scoring matrix (63) can be to a lesser or greater degree granular by adjusting the integer reduction in the word rate score (61) to a greater or lesser range in the pre-selected word rate (62A).

As an example, the look up table can include a word rate scoring matrix (63) in which one pre-selected word rate (62A) matches a word rate score (61) of 100 and each integer deviation in the pre-selected word rate (62A) results in a corresponding integer reduction in the word rate score (61). Therefore, if a pre-selected word rate (62A) of 160 matches a word rate score (61) of 100, then a word rate of 150 or 170 matches a word rate score of 90, a word rate of 140 or 180 matches a word rate score of 80, and so forth. In a second example, a range in the pre-selected word rate (62A) of 150 to 170 can correspond to a word rate score of 100 and each integer deviation in the pre-selected word rate (62A) outside of the range of 150 to 170 words per minute results in a corresponding integer reduction in the word rate score (61). In a particular embodiment, the look up table or word rate scoring matrix (63) can take the form illustrated in FIG. 2B.

Again, referring primarily to FIGS. 1A, 1B, and 2A, in particular embodiments of the presentation scoring module (60) can be further executed to calculate a clarity score (66) based on the total words (54) having a word recognition confidence metric (57) greater than a pre-selected word recognition confidence metric (57A) divided by the total word count (64). In particular embodiments the clarity score (66) can be calculated as follows:

$$(66)\text{Clarity Score} = \frac{\text{Total Words} > 80\% \text{ Confidence}(57A) \times 100}{\text{Total Word Count}(64)}$$

Depending upon the application, the pre-selected percentile confidence metric (57A) can be of greater or lesser percentile to correspondingly increase or decrease the resulting clarity score (66).

Again, referring primarily to FIGS. 1A, 1B and 2A, in particular embodiments of the presentation scoring module (60) can be further executed to calculate a filler word score (67) based on subtrahend equal to the total filler words (55) divided by the total word count (64)×100 subtracted from a pre-selected minuend (67A). When the minuend equal 100, then the subtrahend equal to one percent corresponding reduces the score by one percentage. In particular embodiments, a subtrahend of less than one percent yields a filler word score (67) of 100. In particular embodiments, the minuend can be increased over 100, to allow for a score of 100 when the subtrahend equals a percentage less than the integer amount of the minuend over 100. For example, if the minuend equals 102 and the subtrahend equals 1.5, then the filler word score (67) would be 100. If the minuend equals 101 and the subtrahend equals 1.5, then the filler word score (67) would be 95.5.

Accordingly, in particular embodiments, the filler word score (67) can be calculated as follows:

$$(67)\text{Filler Word Score} = 101(67A) - \frac{(\text{Filler Words}(55) \times 100)}{(\text{Total Word Count}(64))}$$

Again, referring primarily to FIGS. 1A, 1B and 2A, in particular embodiments, the presentation scoring module (60) can be further executed to calculate a presentation score (68) by calculating an average of a sum of the word rate score (61), the clarity score (66), and the filler score (67). In particular embodiments, the presentation score (68) can be calculated as follows:

$$(68)\text{Presentation Score} = \frac{\text{Word Rate Score (61)} + \text{Clarity Score (66)} + \text{Filler Score (67)}}{3}$$

In particular embodiments, the presentation score (68) can comprise a weighted average based on coefficients (69) applied to each of the word rate score (61), the clarity score (66) and the filler score (67) prior to calculating the average to generate the presentation score (68).

Again, referring primarily to FIGS. 1A, 1B and 2A, in particular embodiments, the presentation analyzer (50) can further include an eye contact analyzer (70) executable to calculate occurrence of eye contact (71) of a speaker (51) with an audience (72) during delivery of a speech (52). The eye contact analyzer (70) determines eye contact (71) with the audience (72) by analysis of speaker data (51A), whether live video stream data (24B), or speaker data (51A) retrieved from a media file (40). As an illustrative example, the eye contact analyzer (70) can retrieve eye contact pixel data (73) representative of human head position (74), eye position (75) or iris position (76), or combinations thereof. The eye contact analyzer (70) can then compare pixel intensity level (77) representative of human head position (74), eye position (75), or iris position (76) to one or a plurality of eye contact thresholds (78) to further calculate an eye contact rate (79) by calculating the cumulative time that the pixel intensity level (77) exceeds the one or the plurality of eye contact thresholds (78)(time looking at audience) over the duration of the speaker data (51A), as follows $$(79) \text{Eye Contact Rate} = \frac{\text{Time Looking at Audience}}{\text{Minutes}} * 100$$

As an illustrative example, the speaker data (51A) can include eye contact pixel data (73) that corresponds to the iris position (76) of each eye (79) of the speaker (51). In particular embodiments, the eye contact analyzer (70) can analyze speaker data (51A) to record the iris position (76) based on relative pixel intensity level (77). A pixel intensity level (77) exceeding one or more pre-selected eye contact threshold levels (78) can be counted as an eye contact (71) with the audience (72).

The presentation scoring module (60) can further generate an eye contact score (80) by applying the following rules:
If Eye Contact Rate (79)>90, then the eye contact score=100
If Eye Contact Rate (79)< or =90, then the eye contact score=the Eye Contact Rate (79)

Again, referring primarily to FIGS. 1A, 1B, and 2A, embodiments of the presentation analyzer (50) can further include a tone analyzer (81) executable to analyze tone (82) of a speech (52) represented by the speech data (52A). The tone analyzer (81) receives speech data (52A) and further functions to analyze tone variation (83) over speech data time (89). The tone (82) of a speech (52) represented by speech data (52A) can be characterized by the fundamental frequency ("Fx") contours (84) associated with Fx (85) within the speech data (52A)(having the environmental or mechanical background noise filtered or subtracted out of the speech data (52A)). In particular embodiments, the tone analyzer (81) can analyze the Fx contours (84) of the speech data (52A) for Fx (85). The Fx contour (84) analysis can compare certain characteristics of the speech data (52A): (i) change in Fx (85) that are associated with pitch accents (ii) the range of the Fx (85) used by the speaker (51); (iii) voiced and voiceless regions; and (iv) regular and irregular phonation.

From the Fx contour (84) the tone analyzer (81) can establish the durations of each individual vocal fold cycle (86) for a phrase or passage ("fundamental period data"). From the fundamental period data (87), the tone analyzer (81) can calculate the instantaneous Fx value (88) for each fundamental period data (87). A plurality of Fx values (88) from an utterance or speech data (51A) plotted against speech data time (89) at which they occur gives us an Fx contour (84). The Fx values (88) from speech data (52A) can be used calculate a Fx distribution (90). From the FX distribution (90), the tone analyzer (81) can calculate the central tone tendency (median or mode)(91) and tone variance value (92) from the central tone tendency (91) of the Fx contour (84).

In regard to particular embodiments, the speech data (52A) can be segmented into word data (54A) or syllables. The fundamental frequency contour (84) for the word data (54A) or syllables within the duration of the speech data (52A) can be compared to generate a tone variation value (92) which can be further compared to one or more tone variance thresholds (93) where exceeding the tone variance thresholds (93) results a tone variance (94). The tone analyzer (81) can be further executed to calculate the rate at which a tone variance (94) exceeds the one or more tone variance thresholds (93) to generate a tone rate (95) by the following formula:

$$(95) \text{Tone Rate} = \frac{\text{Tone Variance (94)}}{\text{Minutes}} * 100$$

In particular embodiments, the presentation scoring module (60) can further generate a tone score (96) by applying the following rules:
If Tone Rate (95) is between 0-10, then the Tone Score (96)=0 (monotone)
If Tone Rate (95) is >10, then the Tone Score (96)=100−Tone Rate (95)

Again, referring primarily to FIGS. 1A, 1B and 2A, particular embodiments further including an eye contact score (80) or a tone score (96), the presentation scoring module (60) can be further executed to calculate the Presentation Score (69) by calculating an average of a sum of the word rate score (61), the clarity score (66), the filler score (67), and optionally the eye contact score (80), and optionally the tone score (96). In particular embodiments, the presentation score (69) can be calculated as follows:

$$\text{Speech Score} = \frac{\text{Rate Score} + \text{Clarity Score} + \text{Filer Score} + \text{Tone Score} + \text{Eye Contact Score}}{5}$$

Figure 3:
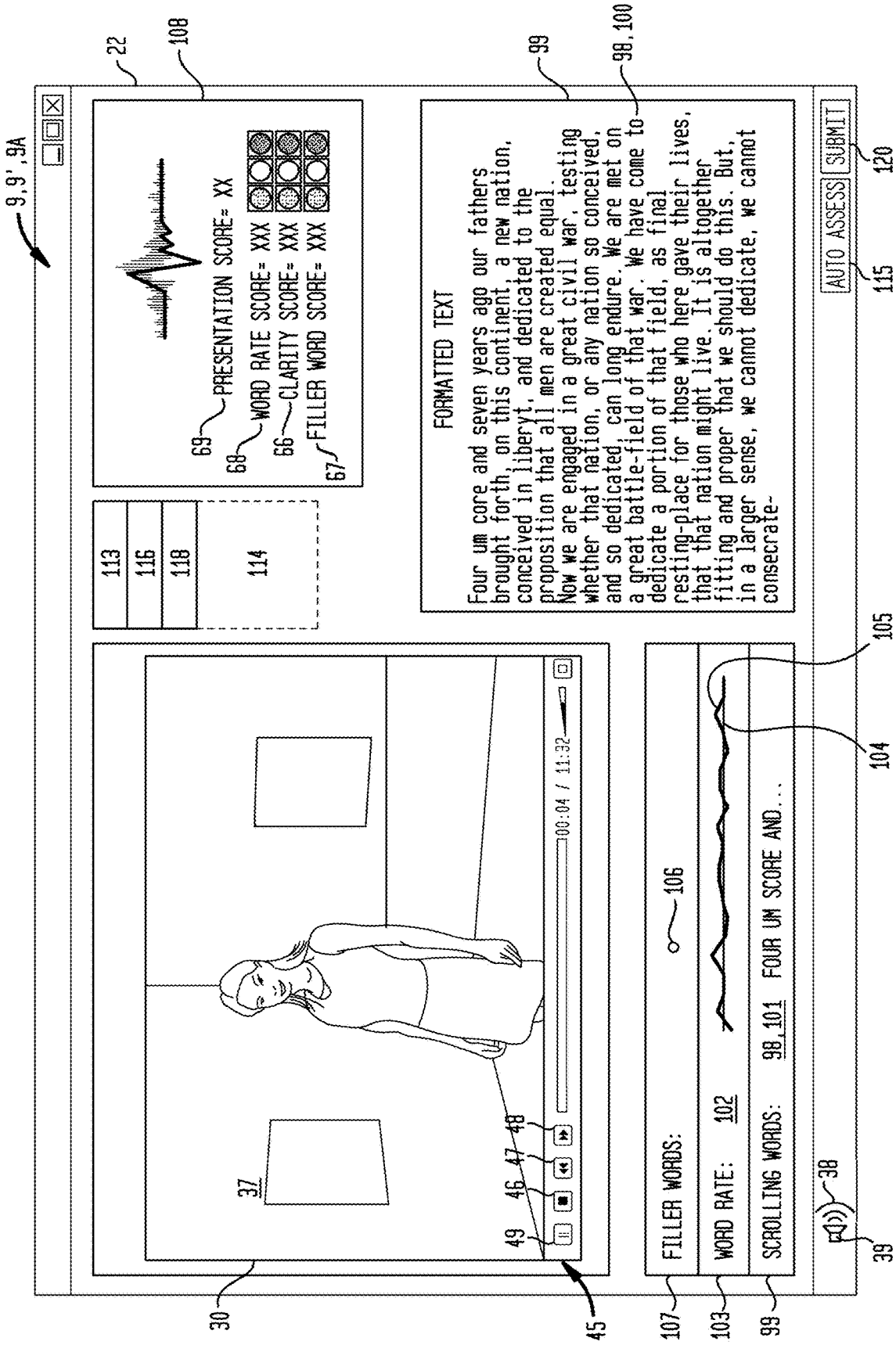
FIG. 3 depicts an illustrative embodiment of a graphical user interface implemented by operation of an embodiment of the interactive presentation assessment and valuation system.

Now, referring primarily to FIG. 3, which provides an illustrative example of a user interface (9)(9')(9A), in accordance with the invention. The user interface (9) can be implemented using various technologies and different devices, depending on the preferences of the designer and the particular efficiencies desired for a given circumstance. By user command (10) the user (26) can activate the user interface module (8) of the program (5) which functions to depict a video display area (30) in a graphical user interface (9) on the display surface (22) associated with the computing device (3). Embodiments of the user interface module (8) can further function to depict further display areas in the graphical user interface (9'). As shown in the illustrative example of FIGS. 1A and 1B, the user interface module (8) can further function to concurrently depict a media display area (31) on the display surface (22) associated with computing device (3).

Again, referring primarily to FIG. 3, in particular embodiments, the program can further include a formatter (97) executable to depict formatted text (98) of the speech (52) including all of the words (54) and the filler words (55) in a formatted text display area (99) on a display surface (22) of a computing device (3). In particular embodiments the formatted text (98) can be depicted as fixed paragraphs (100) include the words (54) of the speech (52) within the formatted text display area (99). In particular embodiments, the formatted text (98) can be depicted as scrolled text (101) of the speech (52) within a formatted text display area (99).

Again, referring primarily to FIG. 3, in particular embodiments, the formatter (97) can further depict a word rate line chart (102) in a word rate line chart display area (103). The particular embodiment of the word rate line chart (102) shown in the example includes a word rate baseline (104) corresponding to the pre-selected word rate (62A) corresponding to a word rate score (61) of 100 superimposed by a word rate line (105) which varies in correspondence to the calculated word rate (62) and affords visual comparison of the word rate (62) of the speech (52) to the pre-selected word rate (62A). In particular embodiments, the formatter (97) coordinates scrolling speed of the word rate line chart (102) in the word rate line chart display area (103) to match scrolling speed of the scrolled text (101) of the speech (52) depicted within the formatted text display area (99) to align word data (54A) representing words (54) and filler words (55) in the scrolled text (101) with the corresponding points in the word rate line (105).

As shown in the illustrative example of FIG. 3, the formatter (97) can concurrently depict the scrolled text (101) in formatted text display area (99) and depict the scrolled word rate line chart (102) in word rate line chart display area (103) in spatial relation to visually align the scrolled text (101) with corresponding time points in the scrolled word rate line chart (102).

Again, referring primarily to FIG. 3, the formatter (97) can be further executed to concurrently depict a filler work indicator (106) in a filler word indicator display area (107) in spatial relation to the scrolled text display area (99) to visually align the filler indicator (106) to the filler word (55) in the scrolled text (101).

Again, referring primarily to FIG. 3, the user interface module (8) can further depict a speech score display area (108) on the display surface (22) associated with the computing device (3). The speech scoring module (60) can be further executed to depict one or more of the word rate score (61), the clarity score (66), filler word score (67) and the presentation score (68) in the corresponding fields within the speech score display area (108).

Now referring to the example of FIGS. 1A and 1B, the user interface module (8) can be executed to depict one or more of: the video display area (30), a media display area (31), formatted text display area (99)(paragraphs (100) or scrolling text (101)), a word rate line chart display area (103), a filler word indicator display area (107)(as shown in the example of FIG. 3) and presentation score display area (108). In the example of FIGS. 1A and 1B, the user interface module (8) can further function to depict a video recorder selector (109) which can as an illustrative example be in the form of a video recorder drop down list (110) which by user command (10) selects a video recorder (24). However, this illustrative example is not intended to preclude other types of selection or activation elements which by user command (10) selects or actives the video recorder (24). Similarly, the user interface module (8) can further provide an audio recorder selector (111) which as shown in the illustrative example can be in the form of an audio recorder drop list (112) which by user command (10) selects an audio recorder (25). A user (26)(26A) can activate the video recorder (24) and the audio recorder (25) by user command (10) to generate a live video stream (24A) and a live audio stream (25A) of a speech (52) which the corresponding encoder module (32) and media input module (36) can process to display the video (37) in the video display area (30) and generate audio (38) from the audio player (39).

In particular embodiments, operation of the video recorder (24) or the audio recorder (25) can further activate the codec module (34) to compress the audio stream (25A) or video stream (24A) or the combined stream and retrievably store each in a database (35) whether internal to the recorder (24)(25), the computing device (3), or in a network server (2) or other network node accessible by the computing device (3).

In the illustrative examples of FIGS. 1A, 1B and 3, the user interface module (8) can be further executable to depict a presentation selector (113) on said display surface (22) of the computing device (3), which in the illustrative examples can be in the form of a presentation drop list (114) which by user command (100) selects and retrieves a media file (40) stored in the database (35). Selection of the media file (40) can activate the media input module (36) to display the video (37) in the video display area (30) and generate audio (38) from the audio player (29). In the particular embodiment illustrated by FIG. 3, the user (26)(26A) can select a first media file (40A)(or a plurality of media files which can be combined), such as an video MP4 file, and can further select a second media file (40B)(or a plurality of media files which can be combined), such as an audio MP3 file, and generate a combined data stream (24C/25C) which can be processed by operation of the program (5), as above described, to display the video (37) in the video image area (30) in the graphical user interface (9)(9') and generate the audio (38) by operation of the audio player (39) associated with the computing device (3).

Now referring primarily to FIG. 3, in particular embodiments, the user interface module (8) can be further executed to depict a presentation analyzer selector (115)(depicted as "Auto Assess" in the example of FIG. 3) which by user command (10) activates the presentation analyzer (50) to analyze the speech data (52A)(whether live video or live audio data streams or video or audio data streams associated with a selected media file(s)), as above described, to calculate one or more of the word rate score (61), the clarity score (66), filler word score (67), the eye contact score (80) or the tone score (96) and further calculate and depict the presentation score (68). In particular embodiments, the calculated scores can be appended to the recorded presentation (44), and the presentation (44) including the calculated scores can be retrievably stored as a media file (40) in a database (35) whether internal to the computing device (3), or in a network server (2) or other network node accessible by the computing device (3). Upon retrieval of the media file (40) from the database (35), the presentation (44) can be depicted in the user interface (9)(9') along with the calculated scores, as above described.

Again, referring primarily to FIG. 3, in particular embodiments, the user interface module (8) can be further executed to depict a preview selector (116) which by user command (10) activates a preview module (117) which allows the user (26)(26A) to preview the presentation (44) on the display surface (22) associated with the computing device (3) prior to activating the presentation analyzer (50).

In particular embodiments, the user interface module (8) can be further depict an editor selector (118) which by user command (10) activates an editor module (119) which functions to allow a user (26)(26A) to modify portions of or replace the speech data (52A)(whether the video stream data (24C) or the audio stream data (25C)) and subsequently process or re-process a plurality of iterations of the edited presentation (44) and analyze and re-analyze the iterations of the presentation (44) by operation of the presentation analyzer (50) to improve one or more of the word rate score (61), the clarity score (66), the filler word score (67), the eye contact score (80), or the tone score (96) to further improve the overall presentation score (68).

Again, referring primarily to FIG. 3, in particular embodiments, the user interface (9)(9')(for example, a student user interface (9A)) can further depict a submission element (120) which by user command (10) by a first user (26) (student user (26A)) in a first computing device (3)(as an example, a student computing device (3A)) in the system (1) transmits the presentation (44)(whether or not processed by the presentation analyzer (50)) to the server (2) to be stored in the database (35).

Figure 4:
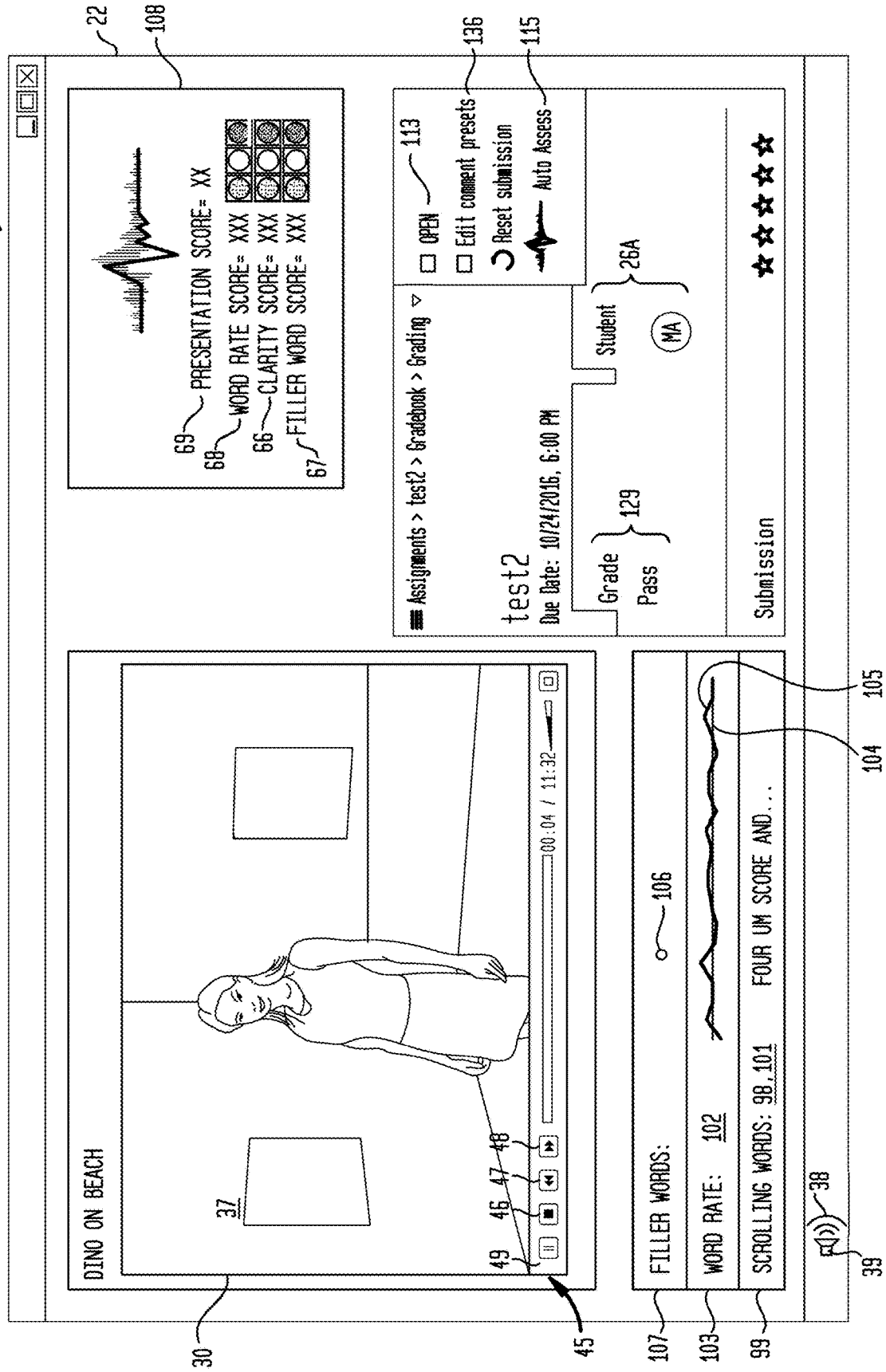
FIG. 4 depicts an illustrative embodiment of a graphical user interface implemented by operation of an embodiment of the interactive presentation assessment and valuation system.

Now referring primarily to FIGS. 1A and 4, a second computing device (3)(as an example, an instructor computing device (3B)) in the system (1) having access to the program (5) through the network (4) and having the corresponding user interface (9)(9')(for example, an instructor user interface (9B)) depicted on the display surface (22) associated with the second computing device (3B) a second user (26)(for example, an instructor user (26B)) can by user command (10) in the presentation selector (113)(114) retrieve a submitted presentation (44) of the first user (9)(for example, a student user (26A)) and by operation of the program (5), as above described, allows the video (37) to be depicted in the video display area (30) and any associated media (31A) to be depicted in a media display area (31) on the display surface (22) of the second computing device (3B)(as shown in the example of FIG. 1A) along with the audio (38) generated by the audio player (39).

In particular embodiments, in which the submitted presentation (44) has not been processed by the presentation analyzer (50), the second user (26B) can by user command (10) in the presentation analyzer selector (115) activate the presentation analyzer (50) to process the submitted presentation (44) and depict one or more of the formatted text (98)(fixed or scrolling), the word rate line chart (102), and filling word indicators (106), and further depict the word rate score (61), clarity score (66), filler word score (67), tone score (96), eye contact score (80) and presentation score (68). The instructor user (26B) may then post a grade (129) which may in part be based upon the presentation score (68) derived by the speech analyzer (50).

Now referring primarily to FIG. 5, in particular embodiments, the system (1) and the program (5) can be incorporated into the context of distance education or correspondence education in which an instructor user (26B) can post one or more assignments (121) in an assignment events interface (122) which can be depicted in the graphical user interface (9')(9B) and further depicted in the graphical user interface (9')(9A) for retrieval of assignments events (124) by one or a plurality of student users (26A). For the purposes of this invention, the term "assignment" means any task or work required of the student user (26B) which includes the production of speech data (52A), and without limitation to the breadth of the foregoing, includes presentations (44) for any purpose which include recording of only an audio stream (25A) or recording only a video stream (24A), or combinations thereof (whether live or stored as a media file).

Again, referring primarily to FIGS. 4 and 5, in particular embodiments, the user interface module (8) can be further executed to depict in the instructor user interface (9B) an assignment events interface (122) which by operation of an assignment events module (123) allows entry by the instructor user (26B) of assignment events (124) and corresponding assignment event descriptions (125) in corresponding assignment events areas (126) and assignment event description areas (127). The assignment events interface (122) can further allow the instructor user (26B) to link assignment resources (128) to each assignment event (124). The assignment events interface (122) further allows the instructor user (26B) to indicate whether or not submitted presentations (44) will be processed by the presentation analyzer (50) to score the presentation (44) which score may be used in part to apply a grade (129) to the presentation (44).

In particular embodiments, the instructor user (26B) by user command (10) in a annotation selector (136) can further activate an annotation module (137) to cause depiction of an annotation display area (138) in which annotations (139) can be entered by the instruction user (26B)(as shown in the example of FIG. 1A).

Again, referring primarily to FIGS. 3 and 5, the graphical user interface module (8) can further function with the assignment module (123) to depict the assignment events interface (122) in the student user interface (9A). The student user (26B) by user command (10) can retrieve the assignment resources (128) linked to each of the assignment events (124). The student user (26B) can undertake each assignment event (124) which in part or in whole includes preparation of a presentation (44) including speech data (52A) and apply the speech analyzer (50) to the speech data (52A), as above described, to obtain one or more of the word rate score (61), the clarity score (66), the filler word score (67), the tone score (96), or the eye contact score (80), and a presentation score (68).

Working Example 1

Figure 6:
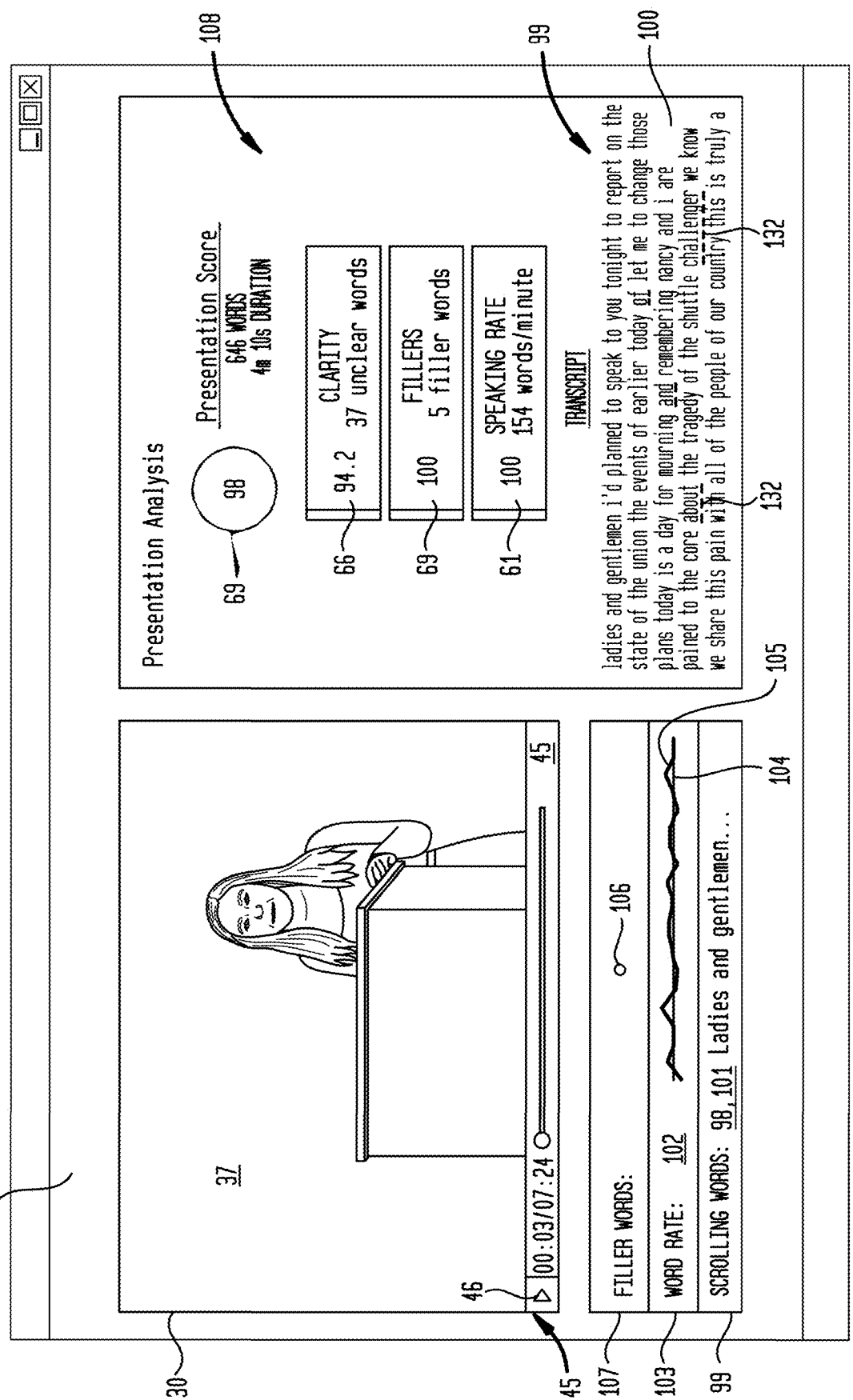
FIG. 6 is first working example in an embodiment of presentation assessment and valuation system.

Now referring primarily to FIG. 6, in a particular embodiment, a user (26) accesses the server (2) through a WAN (4A) and by browser based on-line processing depicts a graphical user interface (9') on the display surface (22) associated with the user (26) computing device(s)(3). The instant embodiment of the graphical user interface (9') depicted includes a video display area (30), a presentation score display area (108), a formatted text display area (99)(for both fixed paragraphs (100) and scrolling text (101)), a word rate line chart display area 103, and a filler word indicator display area (107). The user (26) by user command (10) in the video recorder selector (109) selects a video recorder (24) and in the audio recorder selector (111) selects an audio recorder (25)(as shown in the example of FIG. 1A). By selection of the video recorder (24) and selection of the audio recorder (25), the program (5) by operation of the encoder module (32) encodes the live video stream (24A) and the live audio stream (25A) generated by the video recorder (24) and the audio recorder (25). Concurrently, the codec module (34) compresses the video stream data (24B) or audio stream data (25B) or the combined data stream (24C/25C) and retrievably stores the video stream data (24B) and the audio stream data (25B) in a database (35) and the media input module (36) activates the media presentation module (43) which functions to display the viewable content (37) of the video stream data (24C) in the video display area (30) on the display surface (22) associated with the user (26) computing device (3) and operates the audio player (39) associated with the user (26) computing device (39) to generate audio (38). In the instant example, the viewable content and the audio content represents the user (26) giving an oral presentation (44).

The user (26) by user command (10) in a presentation analyzer selector (115)(as shown in the example of FIG. 1A) activates the presentation analyzer (50) to analyze the speech data (52A)(whether during live streaming of the speech data (52A) or by retrieval of the corresponding media file (40)). Analysis of the speech data (52A), as above described, causes further depiction of the formatted text (98) by operation of one or more of the transcription module (53), the formatter (97) and the media input module (36), as both fixed paragraphs (100) and scrolling text (101) in the respective formatted text display areas (99), a word rate line chart (102) in the a word rate line chart display area (103), and filler word indicators (106) in the filler word indicator display area (107).

Upon analysis of the speech data (52A) representing the presentation (44), the presentation scoring module (60) operates to calculate he presentation score (69) by calculating an average of a sum of the word rate score (61), the clarity score (66), the filler score (67), and optionally the eye contact score (80), and optionally the tone score (96). The media input module further functions to depict presentation score (69), the word rate score (61), the clarity score (66), and the filler score (67) in the presentation score display area (108).

Working Example 2

Figure 7:
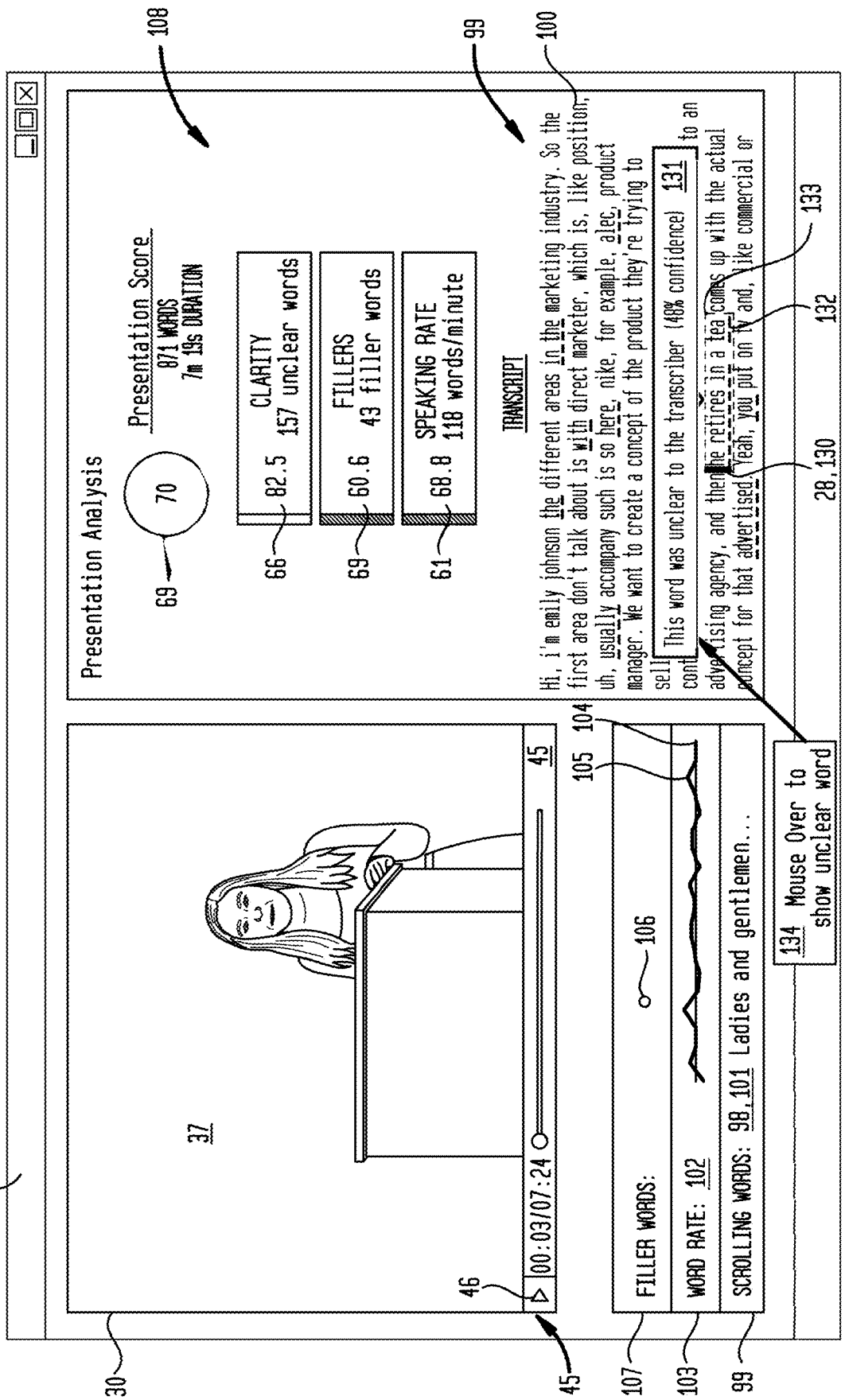
FIG. 7 is second working example in an embodiment of presentation assessment and valuation system.

Now referring primarily to FIG. 7, in a particular embodiment, a user (26) accesses the functionalities of the system (1) by user command (10) in the graphical user interface (9')(as above described in Example 1) resulting in a depiction of the presentation score (69), the word rate score (61), the clarity score (66), and the filler score (67) in the presentation score display area (108) and the formatted text (98) in the respective formatted text display areas (99), a word rate line chart (102) in the a word rate line chart display area (103), and filler word indicators (106) in the filler word indicator display area (107).

In the instant working example, the presentation scoring module (60) can further function to associate or link words or phrases having a word recognition confidence metric (57) of less than a pre-selected word confidence recognition threshold (58A)(referred to as "unclear words (130)") with a clarity score image (131). In particular embodiments, the scoring module (60) can further function to identify and highlight (132) unclear words (130) in the formatted text (98) having a word recognition confidence metric (57) of less than a pre-selected word confidence recognition threshold (58A) of about 80%. The highlight (132) can be depicted by under lineation of the unclear words (130); however, this example does not preclude any manner of visually viewable highlight of unclear words (130), such as shading, colored shading, encircling, dots, bold lines, or the like. Additionally, while examples include a pre-selected word confidence recognition threshold (58A) of 80% or 90%; this is not intended to preclude the use of a greater or lesser pre-selected word confidence recognition threshold (58A), which will typically fall in the range of 70% to about 90% which can be selectable in 1% increments, or other incremental percentile subdivisions.

The presentation scoring module (60) can further function to associate a trigger area (133) with each unclear word (130). The trigger area (133) comprises a graphical control element activated when the user (26) moves a pointer (28) over the trigger area (133). In the instant example, the user (26) by user command (10) in the form of a mouse over (134) activates the trigger area (133); however, the user command (10) could take the form of mouse roll over, touch over, hover, digital pen touch or drag, or other manner of disposing a pointer (28) over the trigger area (133) associated with unclear words (130) in the formatted text (98).

When the user (26) moves the pointer (28) over the trigger area (133) associated with the unclear words (130) in the formatted text (98) the presentation scoring module (60) further operates to depict the clarity score image (131). In the instant example, the clarity score image (131) indicates that that "this word was unclear to the transcriber" and provides the word recognition confidence metric (57) "48% confidence." However, this illustrative working example is not intended to preclude within the clarity score image (131) other text information, graphical information, instructions, or links to additional files, data, or information.

Working Example 3

Figure 8:
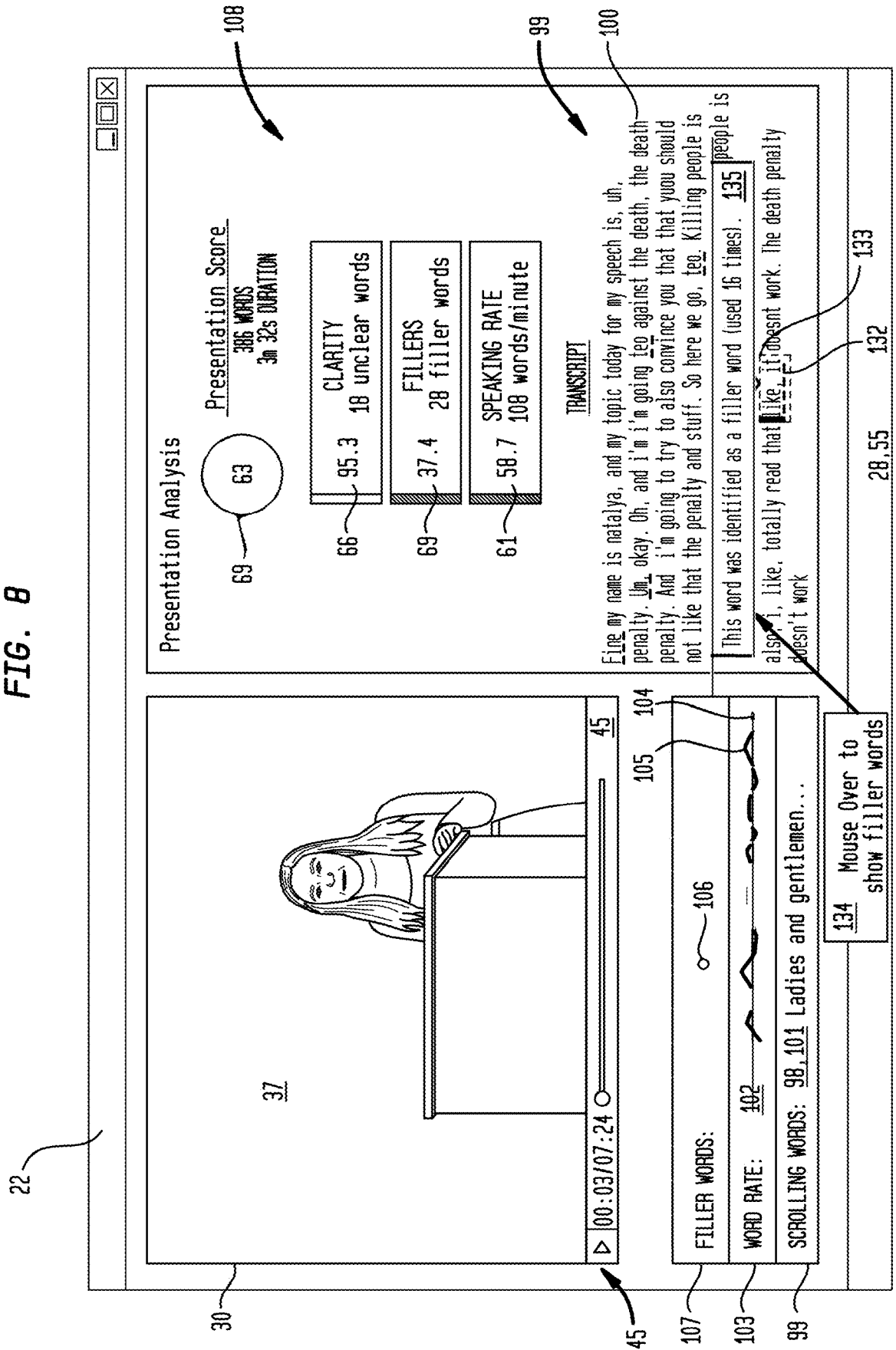
FIG. 8 is third working example in an embodiment of presentation assessment and valuation system.

Now referring primarily to FIG. 8, in a particular embodiment, a user (26) accesses the functionalities of the system (1) by user command (10) in the graphical user interface (9')(as above described in Examples 1 or 2) resulting in a depiction of the presentation score (69), the word rate score (61), the clarity score (66), and the filler score (67) in the presentation score display area (108) and the formatted text (98) in the respective formatted text display areas (99), a word rate line chart (102) in the a word rate line chart display area (103), and filler word indicators (106) in the filler word indicator display area (107).

In the instant working example, the presentation scoring module (60) can further function to associate or link words or phrases used as filler words (55) with a filler score image (135). In particular embodiments, the scoring module (60) can further function to identify and highlight (132) filler words (55) in the formatted text (98). The highlight (132) can be depicted by under lineation of the filler words (55); however, this example does not preclude any manner of visually viewable highlight of filler words (55), such as shading, colored shading, encircling, dots, bold lines, or the like. The highlight (132) of filler words (55) can comprise the graphical element used to identify unclear words (130); but does not preclude the use of different highlight (132) between unclear words (130) and filler words (55).

The presentation scoring module (60) can further function to associate a trigger area (133), as described in working example 2 with each filler word (55). When the user (26) moves the pointer (28) over the trigger area (133) associated with the filler words (55) in the formatted text (98) the presentation scoring module (60) further operates to depict the filler score image (135). In the instant example, the filler score image (135) indicates that that "this word was identified as a filler word" and provides a usage metric "used 16 times." However, this illustrative working example is not intended to preclude within the filler score image (135) other text information, graphical information, instructions, or links to additional files, data, or information.

As can be easily understood from the foregoing, the basic concepts of the present invention may be embodied in a variety of ways. The invention involves numerous and varied embodiments of interactive presentation assessment and valuation system and methods for making and using such interactive presentation assessment and valuation system including the best mode.

As such, the particular embodiments or elements of the invention disclosed by the description or shown in the figures or tables accompanying this application are not intended to be limiting, but rather exemplary of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of an "analyzer" should be understood to encompass disclosure of the act of "analyzing"—whether explicitly discussed or not—and, conversely, were there effectively disclosure of the act of "analyzing", such a disclosure should be understood to encompass disclosure of an "analyzer" and even a "means for analyzing." Such alternative terms for each element or step are to be understood to be explicitly included in the description.

In addition, as to each term used it should be understood that unless its utilization in this application is inconsistent with such interpretation, common dictionary definitions should be understood to be included in the description for each term as contained in the Random House Webster's Unabridged Dictionary, second edition, each definition hereby incorporated by reference.

All numeric values herein are assumed to be modified by the term "about", whether or not explicitly indicated. For the purposes of the present invention, ranges may be expressed as from "about" one particular value to "about" another particular value. When such a range is expressed, another embodiment includes from the one particular value to the other particular value. The recitation of numerical ranges by endpoints includes all the numeric values subsumed within that range. A numerical range of one to five includes for example the numeric values 1, 1.5, 2, 2.75, 3, 3.80, 4, 5, and so forth. It will be further understood that the endpoints of each of the ranges are significant both in relation to the other endpoint, and independently of the other endpoint. When a value is expressed as an approximation by use of the antecedent "about," it will be understood that the particular value forms another embodiment. The term "about" generally refers to a range of numeric values that one of skill in the art would consider equivalent to the recited numeric value or having the same function or result. Similarly, the antecedent "substantially" means largely, but not wholly, the same form, manner or degree and the particular element will have a range of configurations as a person of ordinary skill in the art would consider as having the same function or result. When a particular element is expressed as an approximation by use of the antecedent "substantially," it will be understood that the particular element forms another embodiment.

Moreover, for the purposes of the present invention, the term "a" or "an" entity refers to one or more of that entity unless otherwise limited. As such, the terms "a" or "an", "one or more" and "at least one" can be used interchangeably herein.

Thus, the applicant(s) should be understood to claim at least: i) presentation assessment and valuation system or presentation analyzer herein disclosed and described, ii) the related methods disclosed and described, iii) similar, equivalent, and even implicit variations of each of these devices and methods, iv) those alternative embodiments which accomplish each of the functions shown, disclosed, or described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed.

The background section of this patent application provides a statement of the field of endeavor to which the invention pertains. This section may also incorporate or contain paraphrasing of certain United States patents, patent applications, publications, or subject matter of the claimed invention useful in relating information, problems, or concerns about the state of technology to which the invention is drawn toward. It is not intended that any United States patent, patent application, publication, statement or other information cited or incorporated herein be interpreted, construed or deemed to be admitted as prior art with respect to the invention.

The claims set forth in this specification, if any, are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent application or continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

Additionally, the claims set forth in this specification, if any, are further intended to describe the metes and bounds of a limited number of the preferred embodiments of the invention and are not to be construed as the broadest embodiment of the invention or a complete listing of embodiments of the invention that may be claimed. The applicant does not waive any right to develop further claims based upon the description set forth above as a part of any continuation, division, or continuation-in-part, or similar application.

What is claimed is:

1. A system, comprising:
   a server which serves a program through a network to coordinate processing of a presentation, said program including:
   a user interface executable to:
     depict a graphical user interface on a display surface of a computing device;
     record by user command in said graphical user interface a presentation; retrieve by user indications in said graphical user interface said presentation;
     depict in said graphical user interface on said display surface of said first computing device said presentation; and
   an eye contact analyzer executable to:
     analyze occurrence of eye contact in speaker data within said presentation;
     retrieve pixel data within said presentation corresponding to head, eye, or iris position;
     compare relative pixel intensity level of said pixel data to an eye contact threshold;

calculate an eye contact rate based upon an amount of time units said pixel level intensity exceeds said eye contact threshold divided by total time units encompassed by said speaker data.

2. The system of claim 1, further comprising a presentation scoring module executable to calculate an eye contact score, wherein if said eye contact rate exceeds a pre-selected eye contact rate threshold, then said eye contact score equals 100, and wherein if said eye contact rate is less than the eye contact rate threshold, then the eye contact score equals the eye contact rate.

3. The system of claim 1, further comprising:
a transcription module executable to analyze speech data included in said presentation, including:
count words in said speech data;
count filler words in said speech data; and
depict in said graphical user interface on said display surface of said computing device said presentation;
a formatter executable to:
format text of said speech data including all of said words in said speech data and said filler words in said speech data in a formatted text display area,
depict a filler word indicator visually identifying each filler word in said formatted text;
associate a filler word trigger area with each filler word visually identified in said formatted text;
activate said filler word trigger area by user command; and
depict a filler word score image in said formatted text discrete from said filler word trigger area, said filler word score image including a filler word count of said filler words in said formatted text.

4. The system of claim 3, wherein said formatted text comprises spatially fixed paragraphs.

5. The system of claim 1, further comprising:
a transcription module executable to analyze speech data included in said presentation, including:
count words in said speech data;
count filler words in said speech data; and
depict in said graphical user interface on said display surface of said computing device said recorded presentation; and
a formatter executable to concurrently depict on a display surface of said computing device:
formatted text of said speech data including all of said words in said speech data and said filler words in said speech data in a formatted text display area.

6. The system of claim 1, further comprising:
a transcription module executable to analyze speech data included in said presentation, including:
count words in said speech data;
count filler words in said speech data;
assign a word recognition confidence metric to each of said words and said filler words in said speech data, wherein said recognition confidence metric determined by extracting word confidence features and processing said word confidence features against one or more word confidence feature recognition thresholds for the word;
depict in said graphical user interface on said display surface of said computing device said presentation;
a formatter executable to:
format text of said speech data including all of said words in said speech data and said filler words in said speech data in a formatted text display area, depict a clarity indicator visually identifying each word in said formatted text having a word recognition confidence metric of less than said word recognition confidence metric threshold;
associate a clarity trigger area with each word in said formatted text having said word recognition confidence metric of less than said word recognition confidence metric threshold;
activate said clarity trigger area by user command; and
depict a clarity score image in said formatted text discrete from said clarity trigger area, said clarity score image including said word recognition confidence metric of said word associated with said trigger area.

7. The system of claim 1 further comprising:
a transcription module executable to analyze speech data included in said presentation including:
count words in said speech data;
count filler words in said speech data; and
assign a word recognition confidence metric to each of said words and said filler words in said speech data, wherein said recognition confidence metric determined by extracting word confidence features and processing said word confidence features against one or more word confidence feature recognition thresholds for said words in said speech data;
a presentation scoring module executable to:
calculate a word rate score;
calculate a clarity score;
calculate a filler word score;
calculate a presentation score as an average of the sum of two or more of said word rate score, said clarity score and said filler word score;
associate said word rate score, said clarity score, said filler word score, and said presentation score with said presentation;
retrievably save said presentation associated with said word rate score, said clarity score, said filler word score, and said presentation score in a presentation database; and
depict in said graphical user interface on said display surface of said computing device said presentation and one or more of said word rate score said clarity score, said filler word score, and said presentation score in a presentation score display-area on said display surface associated with said computing device.

8. The system of claim 7, wherein said word rate score equals a pre-selected word rate which corresponds to a word rate score of 100, wherein each integer deviation either above and below said pre-selected word rate results in a corresponding integer reduction in said word rate score of 100.

9. The system of claim 7, wherein said clarity score equals a sum of said words having said word recognition confidence metric greater than a pre-selected word recognition confidence metric divided by the total word count.

10. The system of claim 7, wherein said filler word score equals said filler word count times 100 divided by the total word count.

11. The system of claim 7, wherein said program is executable to:
serve said presentation associated with said word rate score, said clarity score, said filler word score, and said presentation score from said presentation database to either said computing device;

playback said recorded presentation on said computing device, wherein playback includes:

depiction of a video in a video display area on a display surface associated with said computing device;

generation of audio from a speaker associated with said computing device; and depiction of one or more of said word rate score, said clarity score, said filler word score, and said presentation score in a presentation score display area on said display surface associated with said computing device.

12. The system of claim 7, wherein said program is further executable to:

associate a grade with said presentation, said grade variably based on one or more of associated said word rate score, said clarity score, said filler word score, and said presentation score; and retrievably save said recorded presentation associated with said grade in said presentation database accessible by said computing device.

13. The system of claim 7, further comprising a line chart including a word rate baseline and a word rate line which compares a word rate of said speech to said word rate baseline in a word rate line chart display area.

14. The system of claim 13, wherein said word rate baseline corresponds to a pre-selected word rate which matches a word rate score of 100, and wherein and each integer deviation above and below said pre-selected word rate results in a corresponding integer reduction in said word rate score.

* * * * *